(12) United States Patent
Abdur-Rashid et al.

(10) Patent No.: US 8,716,508 B2
(45) Date of Patent: May 6, 2014

(54) METHOD FOR PREPARING A METAL CATALYST

(75) Inventors: Kamaluddin Abdur-Rashid, Mississauga (CA); Dino Amoroso, Binbrook (CA); Xuanhua Chen, Oakville (CA); Rongwei Guo, Oakville (CA); Shuiming Lu, Toronto (CA); Chi-Wing Tsang, Toronto (CA)

(73) Assignee: Kanata Chemical Technologies Inc., Toronto, Ontario (CA)

( * ) Notice: Subject to any disclaimer, the term of this patent is extended or adjusted under 35 U.S.C. 154(b) by 263 days.

(21) Appl. No.: 13/123,982

(22) PCT Filed: Oct. 8, 2009

(86) PCT No.: PCT/CA2009/001412
§ 371 (c)(1),
(2), (4) Date: Nov. 4, 2011

(87) PCT Pub. No.: WO2010/043027
PCT Pub. Date: Apr. 22, 2010

(65) Prior Publication Data
US 2012/0046479 A1 Feb. 23, 2012

Related U.S. Application Data

(60) Provisional application No. 61/106,310, filed on Oct. 17, 2008, provisional application No. 61/225,766, filed on Jul. 15, 2009.

(51) Int. Cl.
*C07F 15/00* (2006.01)
*C07C 233/00* (2006.01)
*C07C 5/05* (2006.01)

(52) U.S. Cl.
USPC ............ 556/20; 556/21; 564/219; 568/814; 585/271; 585/273; 585/274

(58) Field of Classification Search
USPC ....... 556/20, 21; 564/219; 568/814; 585/271, 585/273, 274
See application file for complete search history.

(56) References Cited

U.S. PATENT DOCUMENTS 5,789,374 A    8/1998 Sprecker et al.

FOREIGN PATENT DOCUMENTS

WO    WO0222526    3/2002

OTHER PUBLICATIONS

Abdur-Rashid, K.; Guo, R.; Lough, A. J.; Morris, R. H.; Song, D. Adv. Synth. Catal. 2005, 347, 571.
Amoroso, D.; Graham, T. W.; Guo, R.; Tsang, C.-W.; Abdur-Rashid, K. Aldrichimica Acta 2008, 41, 1, 15.
Dahlhoff, W. V.; Dick, T. R.; Nelson, S. M. J. Chem. Soc. (A) 1969, 2919.
Erre, G. et al. Journal of Molecular Catalysts A: Chemical 280:148-155, 2008.
Kolodny, R. A.; Morris, T. L.; Taylor, R. C. J. Chem. Soc., Dalton Trans. 1973, 328.
Netherton, M. R.; Fu, G. C. Org. Lett. 2001, 3, 4295.
Taylor, R. C.; Kolodny, R. A. J. Chem. Soc., Chem. Comm. 1970, 813.

*Primary Examiner* — Porfirio Nazario Gonzalez
(74) *Attorney, Agent, or Firm* — Bereskin & Parr LLP/S.E.N.C.R.L., s.r.l.; Michael Fenwick

(57) ABSTRACT

The present disclosure relates to a method for preparing a metal catalyst comprising at least one ligand that is coordinated to the metal through at least one phosphorous (P) atom and at least one nitrogen (N) atom, the method comprising reacting a metal pre-cursor complex with an acid addition salt of an aminophosphine, diaminophosphine, aminodiphosphine or diaminodiphosphine, in the presence of a base.

21 Claims, 1 Drawing Sheet

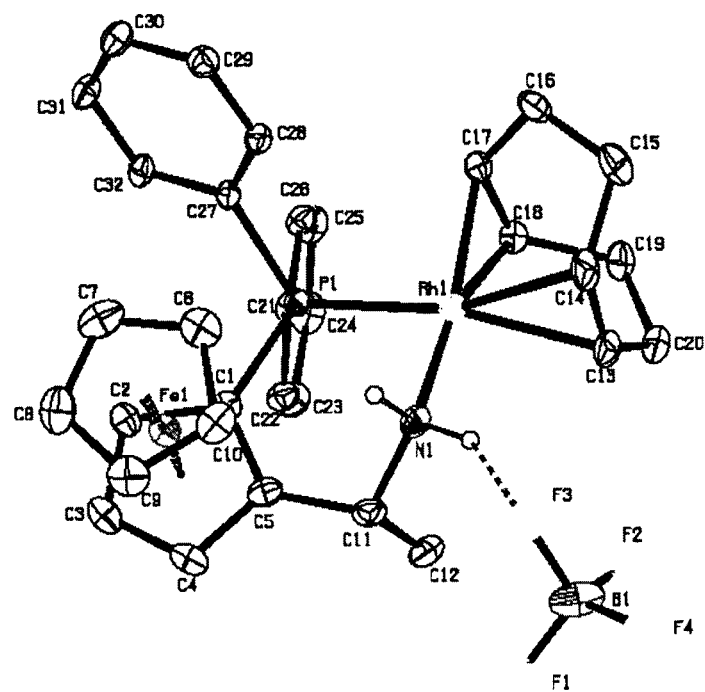

METHOD FOR PREPARING A METAL CATALYST

CROSS REFERENCE TO RELATED APPLICATIONS

This is a national stage application of PCT/CA2009/001412, filed Oct. 8, 2009, which claims priority from U.S. Provisional patent application Ser. No. 61/106,310 filed Oct. 17, 2008 and 61/225,766 filed Jul. 15, 2009, all of which are incorporated herein by reference in their entirety.

FIELD OF THE DISCLOSURE

The present disclosure relates to a method for preparing a metal catalyst comprising at least one ligand that is coordinated to the metal through at least one phosphorous (P) atom and at least one nitrogen (N) atom.

BACKGROUND OF THE DISCLOSURE

Aminophosphine type ligands, such as aminophosphines, diaminophosphines, aminodiphosphines and diaminodiphosphines, represent an important class of ligand as evidenced by the wide range of transformations in which they can participate.[1] As is often the case for phosphorus-based ligands[2], these materials can be extremely sensitive to oxygen making them difficult to handle or even prepare. Fu et al. reported on the stabilization of reactive phosphines via quaternization with acid.[3] The resulting phosphonium salts displayed remarkable stability toward oxygen and moisture while their utility in synthetic and catalytic applications remained highly convenient.

Several reports describing the use of quaternized P—N ligands have appeared however in all cases they were used exclusively as cationic ligands.[4]

SUMMARY OF THE DISCLOSURE

It has now been found that the acid-addition salts of aminophosphine, diaminophosphine, aminodiphosphine and diaminodiphosphine ligands are much more tolerant of ambient conditions (such as reaction with oxygen) and represent convenient alternatives to the often highly air-sensitive unprotected ligands. As such, the acid-addition salts provide a facile method for preparing metal catalysts.

Accordingly, the present disclosure provides a method for preparing a metal catalyst comprising at least one ligand that is coordinated to the metal through at least one phosphorous (P) atom and at least one nitrogen (N), the method comprising reacting a metal pre-cursor complex with an acid addition salt of an aminophosphine, diaminophosphine, aminodiphosphine or diaminodiphosphine, in the presence of a base.

In an embodiment of the disclosure, the metal precursor complex is a compound of the Formula (I):

$$M(X)_a(W)_b(Y)_c(Z)_d \quad (I)$$

wherein
M is a transition metal;
X is any anionic ligand;
W is any co-ordinating ligand;
Y is a neutral ligand;
Z is an acid susceptible anionic ligand;
a is 0, 1 or 2;
b is 0 or 1;
c is 0, 1 or 2; and
d is 0 or 1.

In another embodiment, the aminophosphine ligand is a compound of the Formula II:

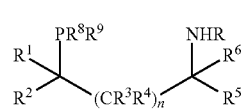

wherein
R and $R^1$ to $R^6$ are simultaneously or independently selected from H, $C_{1-20}$alkyl, $C_{2-20}$alkenyl, $C_{2-20}$alkynyl, $C_{3-20}$cycloalkyl, aryl and heteroaryl, said latter 6 groups being optionally substituted, or two or more of R and $R^1$ to $R^6$ are joined to form, together with the carbon or nitrogen atoms to which they are attached, one or more optionally substituted monocyclic or polycyclic, metalated, saturated, unsaturated and/or aromatic ring systems having 3 or more atoms;

$R^8$ and $R^9$ are simultaneously or independently selected from H, $C_{1-20}$alkyl, $C_{2-20}$alkenyl, $C_{2-20}$alkynyl, aryl, heteroaryl, $OR^{10}$ and $N(R^{10})_2$, said latter 7 groups being optionally substituted, or $R^8$ and $R^9$ are joined to form an optionally substituted monocyclic or polycylic, saturated, unsaturated and/or aromatic ring system having 4 or more atoms, including the phosphorous atom to which said $R^8$ and $R^9$ groups are bonded, and in which one or more carbon atoms in said monocyclic or polycyclic ring system are optionally replaced with a heteromoiety selected from O, S, N, NH, $NC_{1-6}$alkyl, N(O), SiH, $SiC_{1-6}$alkyl and $Si(C_{1-6}$alkyl$)_2$;

$R^{10}$ is selected from $C_{1-6}$alkyl, $C_{2-6}$alkenyl, $C_{2-6}$alkynyl and aryl, said latter 4 groups being optionally fluoro-substituted;

the optional substituents are selected from one or more of halo, OH, $NH_2$, $OR^{11}$, $N(R^{11})_2$ and $R^{11}$; and $R^{11}$ is selected from $C_{1-6}$alkyl, $C_{2-6}$alkenyl, $C_{2-6}$alkynyl and aryl, said latter 4 groups being optionally fluoro-substituted, and n is 0, 1, 2, 3 or 4.

In another embodiment, the diaminophosphine is a compound of the Formula III:

$$R^{12}R^{13}P\text{-}Q^1NR^{14}\text{-}Q^2\text{-}NR^{15}R^{16} \quad (III)$$

wherein
$R^{12}$ and $R^{13}$ are independently as defined for $R^8$ and $R^9$ in formula II, $Q^1$ and $Q^2$ are selected from unsubstituted and substituted $C_1\text{-}C_8$alkylene and unsubstituted or substituted $C_1\text{-}C_8$alkenylene where the substituents on $Q^1$ and $Q^2$ are independently selected from one or more of $C_{1-6}$alkyl, fluoro-substituted $C_{1-6}$alkyl, halo, $C_{1-6}$alkoxy, fluoro-substituted $C_{1-6}$alkoxy and unsubstituted or substituted $C_{6-14}$aryl and/or two or more substituents on $Q^1$ may be joined together to form, including the carbon atoms to which they are attached, one or more unsubstituted or substituted 5-14-membered monocyclic, polycyclic, heterocyclic, carbocyclic, saturated, unsaturated or metallocenyl ring systems, and $R^{14}$, $R^{15}$ and $R^{16}$ are independently selected from H, $C_{1-6}$alkyl, fluoro-substituted $C_{1-6}$alkyl and $C_{6-14}$aryl, the latter group being optionally substituted with one to five substituents independently selected from $C_{1-6}$alkyl, fluoro-substituted $C_{1-6}$alkyl, halo, $C_{1-6}$alkoxy, fluoro-substituted $C_{1-6}$alkoxy and $C_{6-14}$aryl.

In a further embodiment, the aminodiphosphine ligand is a compound of the formula (IV):

$$R^{17}R^{18}P\text{-}Q^3\text{-}NR^{19}\text{-}Q^4\text{-}PR^{20}R^{21} \quad (IV)$$

wherein

R[17], R[18], R[20] and R[21] are independently as defined for R[12] and R[13] in formula III, Q[3] and Q[4] are independently as defined for Q[1] and Q[2] in formula III and R[19] is as defined for R[14] in formula III.

In another embodiment, the diaminodiphosphine ligand is a compound of the formula (V):

$$R^{22}R^{23}P\text{-}Q^5\text{-}NR^{24}\text{-}Q^6\text{-}NR^{25}\text{-}Q^7\text{-}PR^{26}R^{27} \quad (V)$$

wherein

R[22], R[23], R[26] and R[27] are independently as defined for R[12] and R[13] in formula III, Q[5], Q[6] and Q[7] are independently as defined for Q[1] and Q[2] in formula III, and R[24] and R[25] are as defined for R[14], R[15] and R[16] in formula III.

In another embodiment of the disclosure, the acid addition salt of the aminophosphine, diaminophosphine, aminodiphosphine or diaminodiphosphine ligand is prepared by reacting the ligand with a protic acid.

In a further embodiment, the metal catalyst is selected from:

RuCl$_2$(Ph$_2$PCH$_2$CH$_2$NH$_2$)$_2$,
RuCl$_2$(R-BINAP)(Ph$_2$PCH$_2$CH$_2$NH$_2$)$_2$,
RuCl$_2$(i-Pr$_2$PCH$_2$CH$_2$NH$_2$)$_2$,
[Rh(COD)(Ph$_2$PCH$_2$CH$_2$NH$_2$)]BF$_4$,

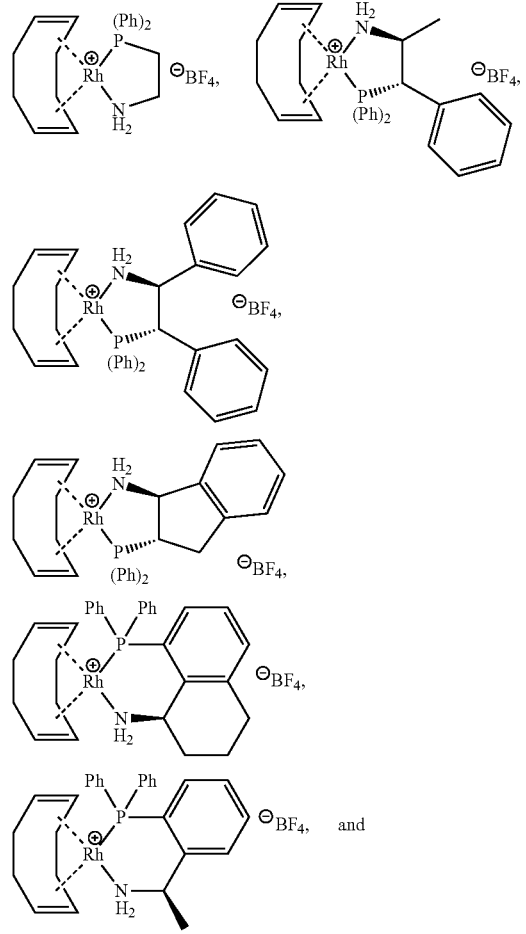

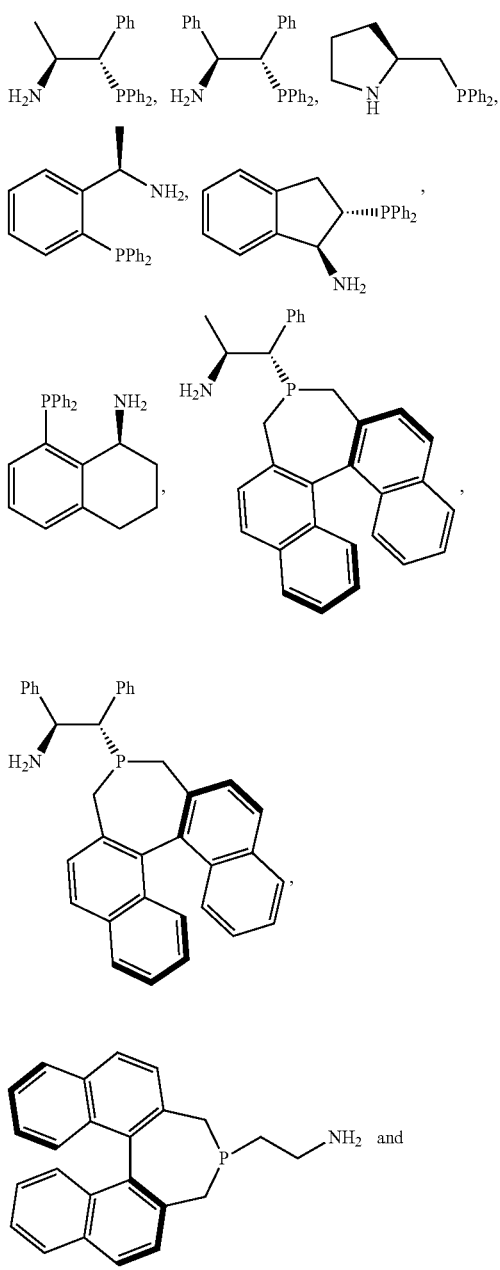

and all optical isomers thereof, including mixtures in any ratio.

In another embodiment, at least one ligand of the metal catalyst comprises a chiral ligand. In a further embodiment, chiral ligand is selected from:

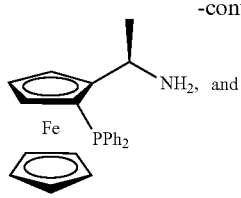

all alternate optical isomers.

In another embodiment, the compound of Formula (II), (III), (IV) or (V) is chiral and is optically pure.

In an embodiment, the metal catalysts produced in accordance with the present disclosure are useful for the selective hydrogenation of double bonds in compounds containing more than one double bond. In another embodiment, the compound containing more than one double bond comprises at least one double bond in a different chemical environment from another double bond, for example at least one endo-cyclic double bond and at least one exo-cyclic double bond. In another embodiment, the metal catalysts produced in accordance with the present disclosure selectively hydrogenate endo-cyclic double bonds over exo-cyclic double bonds, in compounds containing both types of double bonds. For example, the compound containing more than one double bond is

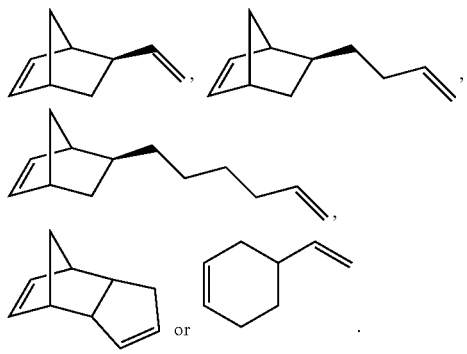

In another embodiment of the disclosure, there is provided a method for the selective hydrogenation of double bonds in compounds containing more than one double bond comprising contacting the compound containing more than one double bond with a metal catalyst produced in accordance with the method of the disclosure, under conditions for performing the selective hydrogenation reaction, and optionally isolating one or more products from the selective hydrogenation reaction. In a further embodiment, the compound containing more than one double bond comprises at least one double bond in a different chemical environment from another double bond. In another embodiment, the compound containing more than one olefin bond comprises at least one endo-cyclic olefin bond and at least one exo-cyclic olefin bond. In another embodiment, the compound containing more than one olefin bond is

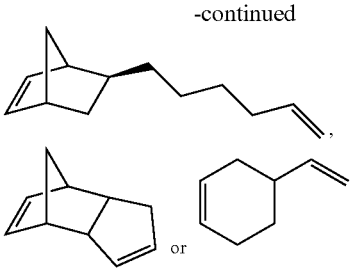

In another embodiment, the endo-cyclic olefin bond is selectively hydrogenated over the exo-cyclic olefin bond.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The disclosure will now be described in greater detail with reference to the following drawings in which:

FIG. 1 shows an x-ray crystallographic structure of a aminophosphine complex in an embodiment of the present disclosure.

DETAILED DESCRIPTION OF THE DISCLOSURE

Definitions

The term "$C_{1-n}$alkyl" as used herein means straight and/or branched chain, saturated alkyl groups containing from one to "n" carbon atoms and includes (depending on the identity of n) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable n is an integer representing the largest number of carbon atoms in the alkyl group.

The term "$C_{2-n}$alkenyl" as used herein means straight and/or branched chain, unsaturated alkyl groups containing from two to n carbon atoms and one or more, suitably one to three, double bonds, and includes (depending on the identity of n) vinyl, allyl, 2-methylprop-1-enyl, but-1-enyl, but-2-enyl, but-3-enyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like, where the variable n is an integer representing the largest number of carbon atoms in the alkenyl group.

The term "$C_{2-n}$alkynyl" as used herein means straight and/or branched chain, unsaturated alkyl groups containing from one to n carbon atoms and one or more, suitably one to three, triple bonds, and includes (depending on the identity of n) ethynyl, 1-propynyl, 2-propynyl, 2-methylprop-1-ynyl, 1-butynyl, 2-butynyl, 3-butynyl, 1,3-butadiynyl, 3-methylbut-1-ynyl, 4-methylbut-ynyl, 4-methylbut-2-ynyl, 2-methylbut-1-ynyl, 1-pentynyl, 2-pentynyl, 3-pentynyl, 4-pentynyl, 1,3-pentadiynyl, 1,4-pentadiynyl, 3-methylpent-1-ynyl, 4-methylpent-2-ynyl4-methylpent-2-ynyl, 1-hexynyl and the like, where the variable n is an integer representing the largest number of carbon atoms in the alkynyl group.

The term "$C_{3-n}$cycloalkyl" as used herein means a monocyclic or polycyclic saturated carbocyclic group containing from three to n carbon atoms and includes (depending on the identity of n), cyclopropyl, cyclobutyl, cyclopentyl, cyclodecyl, bicyclo[2.2.2]octane, bicyclo[3.1.1]heptane and the like, where the variable n is an integer representing the largest number of carbon atoms in the cycloalkyl group.

The term "$C_{3-n}$cycloalkenyl" as used herein means a monocyclic or polycyclic carbocyclic group containing from three to n carbon atoms and one or more, suitably one or two, double bonds and includes (depending on the identity of n), cyclopropenyl, cyclobutenyl, cyclopentenyl, cyclodecenyl, bicyclo[2.2.2]oct-2-ene, bicyclo[3.1.1]hept-2-ene and the like, where the variable n is an integer representing the largest number of carbon atoms in the cycloalkenyl group.

The term "$C_{6-n}$aryl" as used herein means a monocyclic or polycyclic carbocyclic ring system containing from 6 to n carbon atoms, at least one aromatic ring and optionally a metal and includes, depending on the identity of n, phenyl, naphthyl, anthracenyl, 1,2-dihydronaphthyl, 1,2,3,4-tetrahydronaphthyl, fluorenyl, indanyl, indenyl, ferrocenyl, and the like, where the variable n is an integer representing the largest number of carbon atoms in the aryl group.

The term "halo" as used herein means a halogen atom, such as fluorine, chlorine, bromine or iodine.

The term "heteroaryl" as used herein means a monocyclic or polycyclic ring system containing one or two aromatic rings and from 5 to 14 atoms of which, unless otherwise specified, one, two, three, four or five are heteromoieties independently selected from O, S, N, NH, $NC_{1-6}$alkyl, N(O), SiH, $SiC_{1-6}$alkyl and $Si(C_{1-6}alkyl)_2$ and includes thienyl, furyl, pyrrolyl, pyrididyl, indolyl, quinolyl, isoquinolyl, tetrahydroquinolyl, benzofuryl, benzothienyl and the like.

The term "fluoro-substituted" with respect to any specified group as used herein means that the one or more, including all, of the hydrogen atoms in the group have been replaced with a fluorine, and includes trifluoromethyl, pentafluoroethyl, fluoromethyl and the like.

The suffix "ene" added on to any of the above groups means that the group is divalent, i.e. inserted between two other groups.

The term "ring system" as used herein refers to a carbon-containing ring system, that includes monocycles and polycyclic rings and metallocenes. Where specified, the carbons in the rings may be substituted or replaced with heteroatoms. Ring systems include saturated, unsaturated or aromatic rings, or mixtures thereof.

The term "metallocene" as used herein means a structure containing a transition metal and two cyclopentadienyl ligands coordinated in a sandwich structure, i.e., the two cyclopentadienyl anions are co-planar.

The term "polycyclic" as used herein means groups that contain more than one ring linked together and includes, for example, groups that contain two (bicyclic), three (tricyclic) or four (quadracyclic) rings. The rings may be linked through a single bond, a single atom (spirocyclic) or through two atoms (fused and bridged).

The term "optically pure" as used herein means that the compound exists in one optical isomeric form and comprises less than 5%, suitably less than 1% of alternate optical isomeric forms.

Optical isomers are two compounds which contain the same number and kinds of atoms, and bonds (i.e., the connectivity between atoms is the same), and different spatial arrangements of the atoms, but which have non-superimposable mirror images. Each non-superimposable mirror image structure is called an enantiomer. Molecules or ions that exist as optical isomers are called chiral. A plane of plane-polarized light that is passed through a sample of a pure enantiomer is rotated in one direction for a single enantiomer. The plane is rotated in the opposite direction but with the same magnitude when plane-polarized light is passed through a pure sample containing the other enantiomer of a pair.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

METHOD OF THE DISCLOSURE

It has now been found that the acid-addition salts of aminophosphine, diaminophosphine, aminodiphosphine and diaminodiphosphine ligands are much more tolerant of ambient conditions (such as reaction with oxygen) and represent convenient alternatives to the often highly air-sensitive unprotected ligands. As such, the acid-addition salts provide a facile method for preparing metal catalysts.

Accordingly, the present disclosure provides a method for preparing a metal catalyst comprising at least one ligand that is coordinated to the metal through at least one phosphorous (P) atom and at least one nitrogen (N), the method comprising reacting a metal pre-cursor complex with an acid addition salt of an aminophosphine, diaminophosphine, aminodiphosphine or diaminodiphosphine, in the presence of a base.

In an embodiment of the present disclosure, the metal precursor complex is a compound of the Formula (I):

$$M(X)_a(W)_b(Y)_c(Z)_d \qquad (I)$$

wherein

M is a transition metal;

X is any anionic ligand;

W is any co-ordinating ligand;

Y is a neutral ligand;

Z is an acid susceptible anionic ligand;

a is 0, 1 or 2;

b is 0 or 1;

c is 0, 1 or 2; and d is 0 or 1.

In another embodiment, M is ruthenium, rhodium, iron, osmium, iridium, palladium or copper. In a further embodiment, M is ruthenium or rhodium.

In another embodiment of the disclosure, X is halo, $C_{1-6}$alkoxy, $C_{1-6}$carboxylate, $C_{1-6}$sulfonate or $C_{1-6}$nitrate. In a further embodiment, X is Cl.

In an embodiment, W is cyclooctadiene (COD) or BINAP.

In another embodiment of the disclosure, Y is p-cymene.

In an embodiment, Z is acetylacetonate.

In another embodiment of the disclosure, the aminophosphine ligand is a compound of the Formula II:

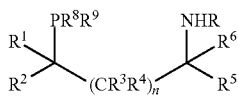

(II)

wherein

R and $R^1$ to $R^6$ are simultaneously or independently selected from H, $C_{1-20}$alkyl, $C_{2-20}$alkenyl, $C_{2-20}$alkynyl, $C_{3-20}$cycloalkyl, aryl and heteroaryl, said latter 6 groups being optionally substituted, or two or more of R and $R^1$ to $R^6$ are joined to form, together with the carbon or nitrogen atoms to which they are attached, one or more optionally substituted monocyclic or polycyclic, metalated, saturated, unsaturated and/or aromatic ring systems having 3 or more atoms;

$R^8$ and $R^9$ are simultaneously or independently selected from H, $C_{1-20}$alkyl, $C_{2-20}$alkenyl, $C_{2-20}$alkynyl, aryl, heteroaryl, $OR^{10}$ and $N(R^{10})_2$, said latter 7 groups being optionally substituted, or $R^8$ and $R^9$ are joined to form an optionally substituted monocyclic or polycyclic, saturated, unsaturated and/or aromatic ring system having 4 or more atoms, including the phosphorous atom to which said $R^8$ and $R^9$ groups are bonded, and in which one or more carbon atoms in said monocyclic or polycyclic ring system are optionally replaced with a heteromoiety selected from O, S, N, NH, $NC_{1-6}$alkyl, N(O), SiH, $SiC_{1-6}$alkyl and $Si(C_{1-6}alkyl)_2$;

$R^{10}$ is selected from $C_{1-6}$alkyl, $C_{2-6}$alkenyl, $C_{2-6}$alkynyl and aryl, said latter 4 groups being optionally fluoro-substituted;

the optional substituents are selected from one or more of halo, OH, $NH_2$, $OR^{11}$, $N(R^{11})_2$ and $R^{11}$; and $R^{11}$ is selected from $C_{1-6}$alkyl, $C_{2-6}$alkenyl, $C_{2-6}$alkynyl and aryl, said latter 4 groups being optionally fluoro-substituted, and n is 0, 1, 2, 3 or 4.

In a further embodiment, R and $R^1$ to $R^6$ are simultaneously or independently selected from the group consisting of H, $C_{1-10}$alkyl, $C_{2-10}$alkenyl, $C_{2-10}$alkynyl, $C_{3-10}$cycloalkyl, aryl and heteroaryl, said latter 6 groups being optionally substituted, or two or more of R and $R^1$ to $R^6$, are joined to form, together with the nitrogen or carbon atoms to which they are attached, one or more optionally substituted monocyclic or polycyclic, metalated, saturated, unsaturated and/or aromatic ring systems having 5 or more atoms. In another embodiment, R and $R^1$ to $R^6$ are simultaneously or independently selected from H, $C_{1-4}$alkyl, $C_{2-4}$alkenyl, $C_{2-4}$alkynyl, $C_{3-6}$cycloalkyl, aryl and heteroaryl, said latter 6 groups being optionally substituted, or two or more groups, including the carbons to which these groups are attached and/or the nitrogen atom of the amino group, are joined to form, together with the carbon atoms to which they are attached, one or two optionally substituted monocyclic or polycyclic, metalated, saturated, unsaturated and/or aromatic ring systems having 5 or more atoms. In a further embodiment, R is H and $R^1$ to $R^6$ are simultaneously or independently selected from H, methyl, or phenyl, or two adjacent or geminal groups, are bonded together with the carbons to which said groups are attached, or together with the nitrogen atom of the amino group, to form one or two phenyl, indanyl, ferrocenyl, naphthyl or pyrrolidinyl rings.

In another embodiment of the disclosure, n is equal to 0 or 1.

In an embodiment, $R^8$ and $R^9$ are simultaneously or independently selected from H, $C_{1-10}$alkyl, $C_{2-10}$alkenyl, $C_{2-10}$alkynyl and aryl, said latter 4 groups being optionally substituted, or $R^8$ and $R^9$ are joined to form an optionally substituted monocyclic or polycyclic ring system having 4 or more atoms, including the phosphorous atom to which $R^8$ and $R^9$ are bonded, in which the rings are saturated, unsaturated and/or aromatic and in which one or more carbon atoms in said monocyclic or polycyclic ring system are optionally replaced with a heteromoiety selected from O, N, NH and $NC_{1-6}$alkyl. In a further embodiment, $R^8$ and $R^9$ are simultaneously or independently selected from H, $C_{1-6}$alkyl, $C_{2-6}$alkenyl, $C_{2-6}$alkynyl, phenyl, and naphthyl, said latter 5 groups being optionally substituted, or $R^8$ and $R^9$ are linked to form an optionally substituted monocyclic, fused bicyclic, fused tricyclic, fused quadracyclic or fused pentacyclic ring system having 4-23 atoms, including the phosphorous atom to which $R^8$ and $R^9$ are bonded, in which the rings are saturated, unsaturated and/or aromatic and in which one or more carbon atoms in said monocyclic or polycyclic ring system are optionally replaced with a heteromoiety selected from O, N, NH and $NC_{1-6}$alkyl. In a further embodiment, $R^8$ and $R^9$ are simultaneously or independently isopropyl, t-butyl, or phenyl. In a further embodiment, $R^8$ and $R^9$ are linked to form an optionally substituted fused pentacyclic ring system having 23 atoms, including the phosphorous atom to which $R^8$ and $R^9$ are bonded. In a further embodiment, the fused pentacyclic ring system comprises

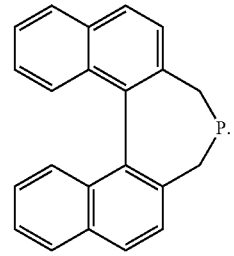

In another embodiment of the present disclosure, $R^{11}$ is selected from $C_{1-4}$alkyl, $C_{2-4}$alkenyl and phenyl, said latter 3 groups being optionally fluoro-substituted. In a further embodiment, $R^{11}$ comprises methyl or phenyl, said latter two groups being optionally fluoro-substituted.

In an embodiment of the disclosure, the compound of Formula (II) is a chiral compound and is an optically pure isomer.

In an embodiment of the present disclosure, the compound of Formula (II) is selected from:

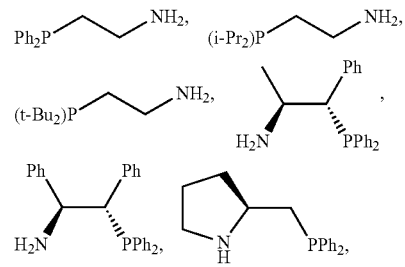

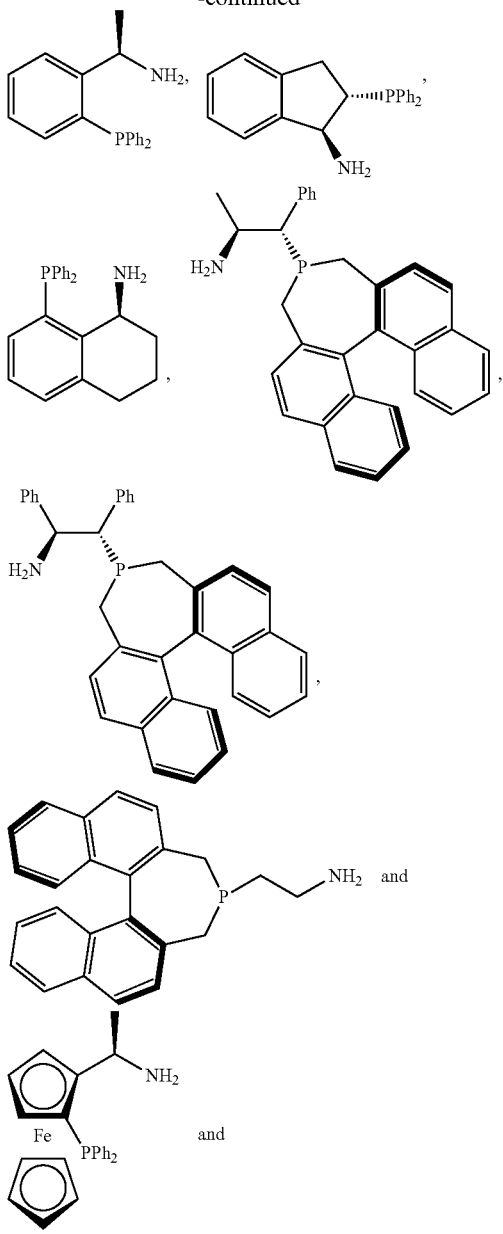

all alternate optical isomers, thereof.

In another embodiment of the present disclosure, the diaminophosphine is a compound of the Formula III:

wherein

R$^{12}$ and R$^{13}$ are independently as defined for R$^8$ and R$^9$ in formula II, Q$^1$ and Q$^2$ are selected from unsubstituted and substituted C$_1$-C$_8$alkylene and unsubstituted or substituted C$_1$-C$_8$alkenylene where the substituents on Q$^1$ and Q$^2$ are independently selected from one or more of C$_{1-6}$alkyl, fluoro-substituted C$_{1-6}$alkyl, halo, C$_{1-6}$alkoxy, fluoro-substituted C$_{1-6}$alkoxy and unsubstituted or substituted C$_{6-14}$aryl and/or two or more substituents on Q$^1$ may be joined together to form, including the carbon atoms to which they are attached, one or more unsubstituted or substituted 5-14-membered monocyclic, polycyclic, heterocyclic, carbocyclic, saturated, unsaturated or metallocenyl ring systems, and R$^{14}$, R$^{15}$ and R$^{16}$ are independently selected from H, C$_{1-6}$alkyl, fluoro-substituted C$_{1-6}$alkyl and C$_{6-14}$aryl, the latter group being optionally substituted with one to five substituents independently selected from C$_{1-6}$alkyl, fluoro-substituted C$_{1-6}$alkyl, halo, C$_{1-6}$alkoxy, fluoro-substituted C$_{1-6}$alkoxy and C$_{6-14}$aryl.

In a further embodiment, the aminodiphosphine ligand is a compound of the formula (IV)

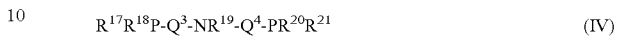

wherein

R$^{17}$, R$^{18}$, R$^{20}$ and R$^{21}$ are independently as defined for R$^{12}$ and R$^{13}$ in formula III, Q$^3$ and Q$^4$ are independently as defined for Q$^1$ and Q$^2$ in formula III and R$^{19}$ is as defined for R$^{14}$ in formula III.

In another embodiment, the diaminodiphosphine ligand is a compound of the formula (V):

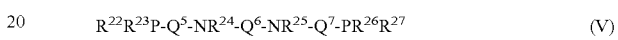

wherein

R$^{22}$, R$^{23}$, R$^{26}$ and R$^{27}$ are independently as defined for R$^{12}$ and R$^{13}$ in formula III, Q$^5$, Q$^6$ and Q$^7$ are independently as defined for Q$^1$ and Q$^2$ in formula III, and R$^{24}$ and R$^{25}$ are as defined for R$^{14}$, R$^{15}$ and R$^{16}$ in formula III.

In an embodiment, the acid addition salt of the aminophosphine, diaminophosphine, aminodiphosphine or diaminodiphosphine ligand is prepared by reacting the ligand with a protic acid. In a further embodiment, the protic acid is HBF$_4$. In another embodiment, the acid addition salt is protonated one or more times. In particular, the acid additions salt is mono- or di-protonated.

In another embodiment of the disclosure, the base is an amine or a metal alkoxide. In a further embodiment, the amine is triethylamine. In another embodiment, the metal alkoxide is potassium t-butoxide.

In an embodiment of the disclosure, the metal catalyst is selected from:
RuCl$_2$(Ph$_2$PCH$_2$CH$_2$NH$_2$)$_2$,
RuCl$_2$(R-BINAP)(Ph$_2$PCH$_2$CH$_2$NH$_2$)$_2$,
RuCl$_2$(i-Pr$_2$PCH$_2$CH$_2$NH$_2$)$_2$,
[Rh(COD)(Ph$_2$PCH$_2$CH$_2$NH$_2$)]BF$_4$,

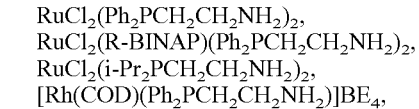

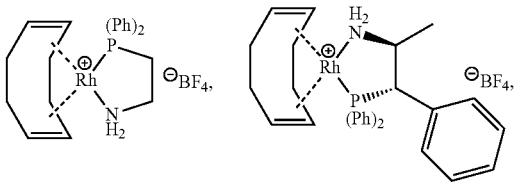

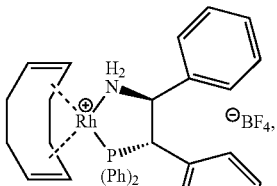

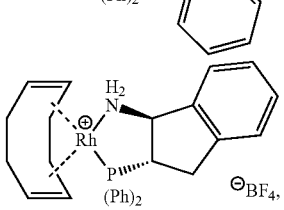

-continued

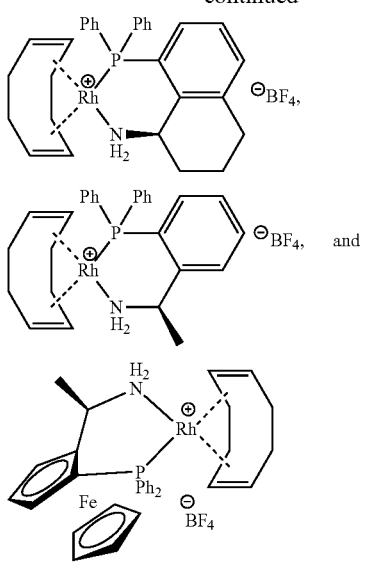

and all optical isomers thereof, including mixtures in any ratio.

In another embodiment of the present disclosure, at least one ligand of the metal catalyst comprises a chiral ligand. In a further embodiment, wherein the chiral ligand is selected from:

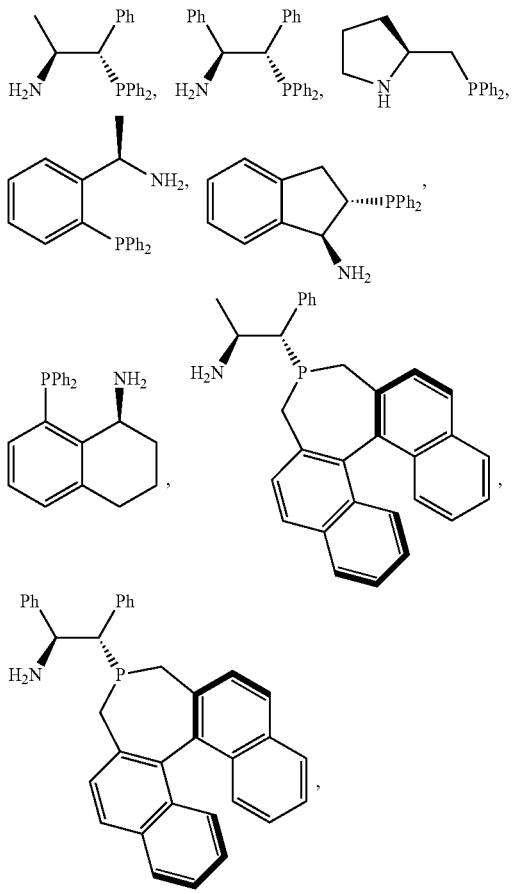

-continued

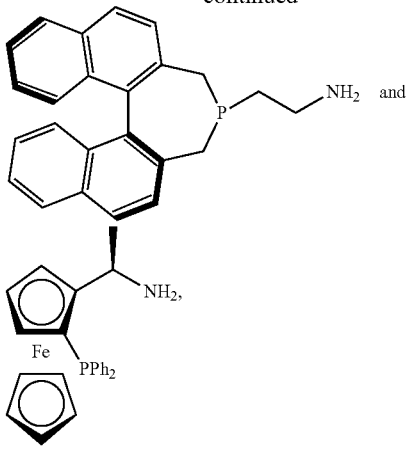

and all alternate optical isomers thereof.

Aminophosphine, diaminophosphine, aminodiphosphine or diaminodiphosphine ligands are often oily compounds, unstable and/or pyrophoric, making them very difficult to handle as reactants. Reacting the ligands with a protic acid, in accordance with the teachings of the present disclosure, results in the rapid and quantitative preparation of stable quaternary acid addition salts of the ligand. These salts are easily handled and stable in air. In an embodiment, the reaction of the ligand results in the quaternization of one or more nitrogen atoms of the ligand. In another embodiment, in addition to the quaternization of a nitrogen atom, the phosphorous may also be protonated. The resulting acid addition salts are readily isolated by separation of the biphasic mixture and precipitation of the salt using a solvent, such as hexane or diethyl ether.

The acid addition salts are then reacted with a metal precursor complex in a solvent, in the presence of a base, resulting in the facile preparation of metal catalysts possessing aminophosphine, diaminophosphine, aminodiphosphine or diaminodiphosphine ligands. In certain embodiments, the base may be generated in situ by the displacement of an acid susceptible anionic ligand meaning that the addition of a base is not required.

The metal catalysts produced in accordance with the present disclosure can be used in any synthetic reaction that is able to be catalyzed by the catalysts. Such reactions include, but are not limited to hydrogenations, hydroformylations, additions of organolithiums to aldehydes and cycloadditions.

In an embodiment, the metal catalysts produced in accordance with the present disclosure are useful for the selective hydrogenation of double bonds in compounds containing more than one double bond. In another embodiment, the compound containing more than one double bond comprises at least one double bond in a different chemical environment from another double bond, for example at least one endo-cyclic double bond and at least one exo-cyclic double bond. In another embodiment, the metal catalysts produced in accordance with the present disclosure selectively hydrogenate endo-cyclic double bonds over exo-cyclic double bonds, in compounds containing both types of double bonds. For example, the compound containing more than one double bond is

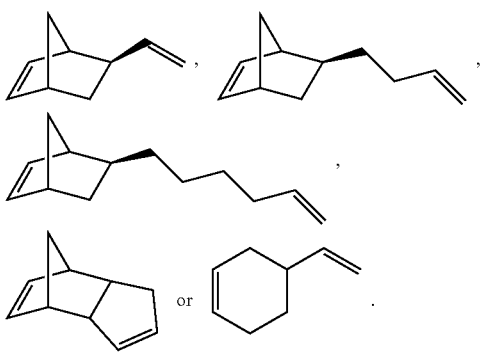

It will be understood by those skilled in the art that catalysts of the prior art are generally not able to selectively hydrogenate double bonds. Accordingly, as seen in Scheme 1, if there is more than one double bond present in a compound, catalysts found in the prior art hydrogenate both double bonds, even under mild conditions. Moreover, there can also be a loss of existing stereochemistry in the compound.

Scheme 1

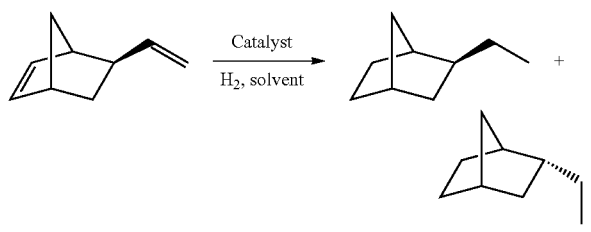

In another embodiment, the metal catalysts produced in accordance with the present disclosure selectively hydrogenated the endo-cyclic double bond over the exo-cyclic double bond in 5-vinyl-2-norbornene, as seen in Scheme 2.

Scheme 2

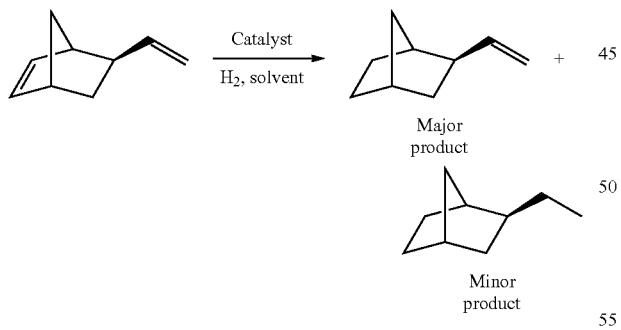

In another embodiment, the metal catalysts produced in accordance with the present disclosure are useful for the selective hydrogenation of compounds containing more than one double bond, such as compounds relevant to flavor and fragrance applications, such as those disclosed in U.S. Pat. No. 5,789,374 to Sprecker et al., herein incorporated by reference. Further, the metal catalysts produced in accordance with the present disclosure are also useful for the selective hydrogenation of compounds containing more than one double bond that are used in polymer and electronic materials applications.

The following non-limiting examples are illustrative of the present disclosure:

EXAMPLES

Experimental

Unless otherwise indicated, all manipulations were carried out under an atmosphere of argon. Dry, degassed solvents were obtained using an Innovative Technology solvent purification system. NMR solvents were sparged with argon and dried over molecular sieves. [RuCl$_2$(p-cymene)]$_2$ and [RuCl$_2$(COD)]$_2$ were prepared according to literature procedures. HBF$_4$ was obtained from Aldrich and used as received. RhCOD(acac) was obtained from Colonial Metals.

Example 1

Synthesis of Quaternized Aminophosphine Ligands

Example 1(a)

[Ph$_2$PCH$_2$CH$_2$NH$_3$]BF$_4$

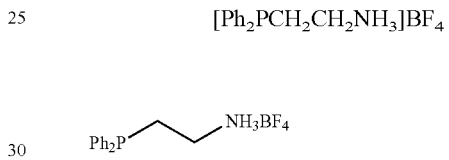

To a stirred solution of Ph$_2$PCH$_2$CH$_2$NH$_2$ (1.00 g, 4.36 mmol) in CH$_2$Cl$_2$ (10 mL) was added an aqueous solution of HBF$_4$ (0.80 g, 48% wt.) dropwise via syringe. The resulting heterogeneous mixture became warm to the touch. After stirring for two hours at ambient temperature the organic layer was removed and dried, in air, over MgSO$_4$ and then reduced to dryness leaving a pale yellow foam. The foam was taken up in CH$_2$Cl$_2$ (3 mL) and then hexanes was added to afford the very pale yellow solid (1a). Yield 0.83 g (60%). $^1$H NMR (300 MHz, CD$_2$Cl$_2$): d 2.40 (br m, 2H, CH$_2$), 3.09 (br m, 2H, CH$_2$), 6.39 (br s, 3H, NH$_3$), 7.2-7.5 (br m, 10H, Ar). $^{31}$P NMR (121.4 MHz, CD$_2$Cl$_2$): d −21.9 (s). $^{19}$F NMR (375.9 MHz, CD$_2$Cl$_2$): −148.9 (s).

Example 1(b)

[$^i$Pr$_2$PCH$_2$CH$_2$NH$_3$]BF$_4$

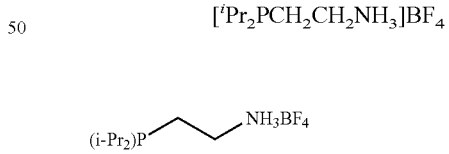

To a chilled (0° C.), stirred solution of $^i$Pr$_2$PCH$_2$CH$_2$NH$_2$ (0.50 g, 3.10 mmol) in CH$_2$Cl$_2$ (10 mL) was added an aqueous solution of HBF$_4$ (0.41 mL, 48% wt.) dropwise via syringe. The mixture was allowed to warm to ambient temperature and after stirring for 30 minutes the organic layer was removed, dried over MgSO$_4$ and then reduced to dryness leaving a white solid. The solid was redissolved in CH$_2$Cl$_2$ (2 mL) and then diethyl ether was added to afford a white solid (1b) which was filtered off and dried in vacuo. $^1$H NMR (300 MHz, CD$_2$Cl$_2$): d 1.11 (br m, 12H, CH$_3$), 2.00 (br s, 4H, CH$_2$), 3.18 (br s, 2H, CH), 6.57 (br s, 3H, NH$_3$). $^{31}$P NMR (121.4 MHz, CD$_2$Cl$_2$): d 4.6 (br, 97% integrated intensity), 63.1 (s, 3% integrated intensity). $^{19}$F NMR (282.3 MHz, CD$_2$Cl$_2$): d −149.2 (s).

Example 1(c)

[S,S-Ph$_2$PCH(Ph)CH(CH$_3$)NH$_3$]BF$_4$

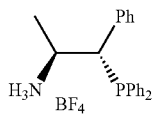

To a stirred solution of (S,S)-Ph$_2$PCH(Ph)CH(CH$_3$)NH$_2$ (0.49 g, 1.52 mmol) in CH$_2$Cl$_2$ (10 mL) was added an aqueous solution of HBF$_4$ (0.20 mL, 48% wt.) dropwise via syringe. The resulting heterogeneous mixture became warm to the touch. After stirring for 30 minutes at ambient temperature the organic layer was removed, dried over MgSO$_4$ and then reduced to dryness leaving a white solid. The solid was redissolved in CH$_2$Cl$_2$ (2 mL) and then hexanes was added to afford a white solid (1c) which was filtered off and dried in vacuo. Yield 0.58 g (94%). $^1$H NMR (300 MHz, CD$_2$Cl$_2$): d 1.34 (br, 3H, CH$_3$), 3.49 (br, 1H, CH), 4.12 (br, 1H, CH), 6.34 (br, 3H, NH$_3$), 7.2-7.7 (br, 15H, Ar). $^{31}$P NMR (121.4 MHz, CD$_2$Cl$_2$): d −10.4 (s). $^{19}$F NMR (282.3 MHz, CD$_2$Cl$_2$): −147.

Example 1(d)

(1S,2S)-1-((4R,11bS)-3H-dinaphtho[2,1-c:1',2'-e]phosphepin-4(5H)-yl)-1-phenylpropan-2-aminium tetrafluoroborate

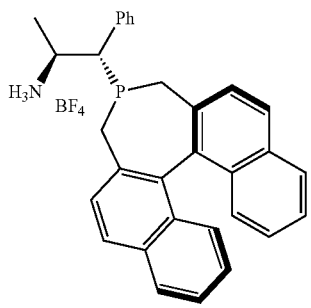

To a stirred solution of (1S,2S)-1-((4R,11bS)-3H-dinaphtho[2,1-c:1',2'-e]phosphepin-4(5H)-yl)-1-phenylpropan-2-amine (0.50 g, 1.12 mmol) in CH$_2$Cl$_2$ (10 mL) was added an aqueous solution of HBF$_4$ (0.15 mL, 48% wt.) dropwise via syringe. The resulting heterogeneous mixture became warm to the touch. After stirring for 30 minutes at ambient temperature the organic layer was removed, dried over MgSO$_4$ and then reduced to dryness leaving a white solid (1d). The solid was redissolved in CH$_2$Cl$_2$ (2 mL) and then hexanes was added to afford a white solid which was filtered off and dried in vacuo. Yield 0.39 g (65%). $^1$H NMR (300 MHz, CD$_2$Cl$_2$): d 1.58 (br, 3H, CH$_3$) 1.98 (br, 1H), 2.19 (br, 1H), 2.80 (br, 2H), 3.13 (br, 1H), 4.18 (br, 1H), 6.32 (br, 3H, NH$_3$), 7.00-8.20 (br m, 17H, Ar). $^{31}$P NMR (121.4 MHz, CD$_2$Cl$_2$): d 8.8 (br s). $^{19}$F NMR (282.3 MHz, CD$_2$Cl$_2$): d −147.4 (s).

Example 1(e)

2-(Di-tert-butylphosphinol)ethylammonium tetrafluoroborate

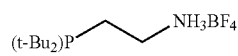

To a solution of 2-(di-tert-butylphosphino)ethylamine (0.50 g, 2.64 mmol) in CH$_2$Cl$_2$ (10 mL) was added an aqueous solution of HBF$_4$ (0.34 mL, 48 wt %) dropwise via syringe. After stirring for 30 minutes at ambient temperature the organic layer was removed, dried over MgSO$_4$, and then reduced to dryness leaving a white solid. The solid was then redissolved in CH$_2$Cl$_2$ (2 mL) and then hexanes was added to afford a white solid (1e) which was filtered off and dried in vacuo. Yield 0.60 g (82%). $^1$H NMR (300 MHz, CD$_2$Cl$_2$): d 1.23 (d, 18H, $^t$Bu), 2.03 (br, 2H, CH$_2$), 3.27 (br, 2H, CH$_2$), 6.14 (br, 3H, NH$_3$). $^{31}$P NMR (121.4 MHz, CD$_2$Cl$_2$): d 26.5 (s). $^{19}$F NMR (282.3 MHz, CD$_2$Cl$_2$): d −148.8(s).

Example (1f)

(S)-2-((diphenylphosphino)methyl)pyrrolidinium tetrafluoroborate

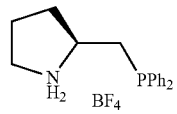

To a solution of (S)-2-((diphenylphosphino)methyl)pyrrolidine (0.51 g, 1.89 mmol) in CH$_2$Cl$_2$ (10 mL) was added an aqueous solution of HBF$_4$ (0.25 mL, 48 wt %) dropwise via syringe. After stirring for 30 minutes at ambient temperature the organic layer was removed, dried over MgSO$_4$, and then reduced to dryness leaving a white residue. The residue was redissolved in CH$_2$Cl$_2$ (2 mL) and then Et$_2$O was added to afford a colorless liquid (1f) and dried in vacuo. Yield 0.40 g (60%). $^1$H NMR (300 MHz, CD$_2$Cl$_2$): d 1.26, 1.27 (dm, 2H, CH$_2$), 1.55, 1.64 (dm, 2H, CH$_2$), 1.98, 2.29 (dm, 2H, CH$_2$), 2.82, 2.92 (dm, 2H, CH$_2$), 3.06 (br, 1H, CH), 4.97 (br, 2H, NH$_2$), 6.65-7.40 (br m, 10H, Ar). $^{31}$P NMR (121.4 MHz, CD$_2$Cl$_2$): d −20.8 (s). $^{19}$F NMR (282.3 MHz, CD$_2$Cl$_2$): d −149.9 (s).

Example 1(g)

(1S,2S)-2-(Diphenylphosphino)1,2-diphenylethylammonium tetrafluoroborate

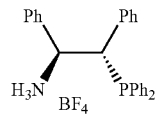

To a solution of (1S,2S)-2-(Diphenylphosphino)1,2-diphenylethylammine (0.091 g, 0.24 mmol) in CH$_2$Cl$_2$ (5 mL) was added an aqueous solution of HBF$_4$ (0.033 mL, 48 wt %) dropwise via syringe. After stirring for 30 minutes at ambient temperature the organic layer was removed, dried over MgSO$_4$, and then reduced to dryness leaving a white solid (1g). The solid was redissolved in CH$_2$Cl$_2$ (1 mL) and then hexanes was added to afford a white solid which was filtered off and dried in vacuo. Yield 0.067 g (60%). $^1$H NMR (300 MHz, CD$_2$Cl$_2$): d 4.48 (1br, 1H, CH), 4.68 (1br, 1H, CH), 6.50-7.92 (br m, 20H, Ar). $^{31}$P NMR (121.4 MHz, CD$_2$Cl$_2$): d −9.95 (s). $^{19}$F NMR (282.3 MHz, CD$_2$Cl$_2$): d −148.0(s).

Example 1(h)

(R)-1-(2-(diphenylphosphino)phenyl)ethanammonium tetrafluoroborate

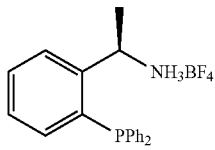

To a solution of (R)-1-(2-(diphenylphosphino)phenyl)ethanamine (1.06 g, 3.46 mmol) in CH$_2$Cl$_2$ (10 mL) was added an aqueous solution of HBF$_4$ (0.45 mL, 48 wt %) dropwise via syringe. After stirring for 30 minutes at ambient temperature the organic layer was removed, dried over MgSO$_4$, and then reduced to dryness leaving a pale yellow solid. The solid was redissolved in CH$_2$Cl$_2$ (2 mL) and then diethyl ether was added to afford a pale yellow solid (1h) which was filtered off and dried in vacuo. Yield 1.12 g (82%). $^1$H NMR (300 MHz, CD$_2$Cl$_2$): d 1.45 (d, 3H, CH$_3$), 6.60 (br, 3H, NH$_3$), 7.02-7.57 (br m, 14H, Ar). $^{31}$P NMR (121.4 MHz, CD$_2$Cl$_2$): d −17.5 (s). $^{19}$F NMR (282.3 MHz, CD$_2$Cl$_2$): d −147.6 (s).

Example 1(i)

(1S,2S)-2-(diphenylphosphino)-2,3-dihydro-1H-inden-1-ammonium tetrafluoroborate

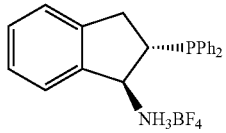

To a solution of (1S,2S)-2-(diphenylphosphino)-2,3-dihydro-1H-inden-1-amine (0.50 g, 1.58 mmol) in CH$_2$Cl$_2$ (10 mL) was added an aqueous solution of HBF$_4$ (0.21 mL, 48 wt %) dropwise via syringe. After stirring for 30 minutes at ambient temperature the organic layer was removed, dried over MgSO$_4$, and then reduced to dryness leaving a pale yellow solid (1i). The solid was redissolved in CH$_2$Cl$_2$ (2 mL) and then hexanes was added to afford a pale yellow solid which was filtered off and dried in vacuo. Yield 0.46 g (72%). $^1$H NMR (300 MHz, CD$_2$Cl$_2$): d 2.78 (dd, 1H, CHPPh$_2$, 3.36, 3.48 (m, 2H, CH$_2$), 4.47 (d, 1H, CHNH$_3$), 7.10-7.60 (br m, 14H, Ar). $^{31}$P NMR (121.4 MHz, CD$_2$Cl$_2$): d −6.4 (s). $^{19}$F NMR (282.3 MHz, CD$_2$Cl$_2$): d −148.0 (s).

Example 1(j)

(S)-8-(diphenylphosphino)-1,2,3,4-tetrahydronaphthalen-1-ammonium tetrafluoroborate

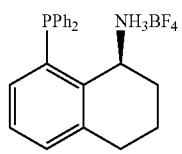

To a solution of (S)-8-(diphenylphosphino)-1,2,3,4-tetrahydronaphthalen-1-amine (0.51 g, 1.54 mmol) in CH$_2$Cl$_2$ (10 mL) was added an aqueous solution of HBF$_4$ (0.20 mL, 48 wt %) dropwise via syringe. After stirring for 30 minutes at ambient temperature the organic layer was removed, dried over MgSO$_4$, and then reduced to dryness leaving a white solid (1j). The solid was redissolved in CH$_2$Cl$_2$ (2 mL) and then hexanes was added to afford a white solid which was filtered off and dried in vacuo. Yield 0.61 g (94%). $^1$H NMR (300 MHz, CD$_2$Cl$_2$): d 1.85 (br, 2H, CH$_2$), 2.24 (br, 2H, CH$_2$), 2.75-2.98 (br m, 2H, CH$_2$), 4.85 (br, 1H, CH), 6.88-7.44 (br m, 13H, Ar). $^{31}$P NMR (121.4 MHz, CD$_2$Cl$_2$): d −17.2 (s). $^{19}$F NMR (282.3 MHz, CD$_2$Cl$_2$): d −149.0 (s).

Example 1(k)

(1S,2S)-2-((4R,11bS)-3H-dinaphtho[2,1-c:1',2'-e]phosphepin-4(5H)-yl)-1,2-diphenylethanammonium tetrafluoroborate

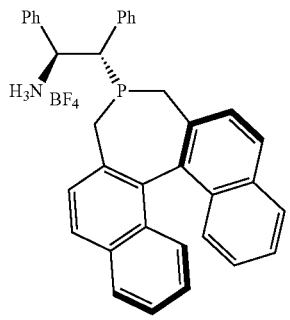

To a solution of (1S,2S)-2-((4R,11bS)-3H-dinaphtho[2,1-c:1',2'-e]phosphepin-4(5H)-yl)-1,2-diphenylethanamine (0.33 g, 0.65 mmol) in CH$_2$Cl$_2$ (10 mL) was added an aqueous solution of HBF$_4$ (0.20 mL, 48 wt %) dropwise via syringe. After stirring for 30 minutes at ambient temperature the organic layer was removed, dried over MgSO$_4$, and then reduced to dryness leaving a white solid (1k). The solid was redissolved in CH$_2$Cl$_2$ (2 mL) and then hexanes was added to afford a white solid which was filtered off and dried in vacuo. Yield 0.23 g (59%). $^1$H NMR (300 MHz, CD$_2$Cl$_2$): d 2.30 (ddm, 4H, CH$_2$), 3.34 (br, 1H, CH), 4.73 (br, 1H, CH), 5.60

(br, 3H, NH$_3$), 6.63-7.98 (br m, 22H, Ar). $^{31}$P NMR (121.4 MHz, CD$_2$Cl$_2$): d 8.08 (s). $^{19}$F NMR (282.3 MHz, CD$_2$Cl$_2$): d −147.4(s).

Example 1(l)

(R)-1-((S)-2-Diphenylphosphino)ferrocenylethylammonium tetrafluoroborate

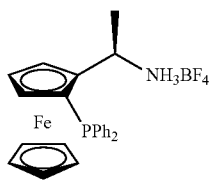

To a solution of (R)-1-((S)-2-Diphenylphosphino)ferrocenylethylamine (0.51 g, 1.24 mmol) in CH$_2$Cl$_2$ (10 mL) was added an aqueous solution of HBF$_4$ (0.16 mL, 48 wt %) dropwise via syringe. After stirring for 30 minutes at ambient temperature the organic layer was removed, dried over MgSO$_4$, and then reduced to dryness leaving a orange solid (1l). The solid was redissolved in CH$_2$Cl$_2$ (2 mL) and then hexanes was added to afford a orange solid which was filtered off and dried in vacuo. Yield 0.55 g (88%). $^1$H NMR (300 MHz, CD$_2$Cl$_2$): d 1.57 (d, 3H, CH$_3$), 3.40 (q, 1H, CH), 4.06 (s, 1H, CH), 4.1 (s, 5H, C$_5$H$_5$), 4.52 (s, 1H, CH), 4.58 (s, 1H, CH), 7.22-7.60 (br m, 10H, Ar). $^{31}$P NMR (121.4 MHz, CD$_2$Cl$_2$): d −25.3 (s). $^{19}$F NMR (282.3 MHz, CD$_2$Cl$_2$): d −149.5 (s).

Example 1(m)

2-((11bS)-3H-Binaphtho[2,1-c:1',2'-e]phosphepin-4 (5H)-yl)ethanammonium tetrafluoroborate

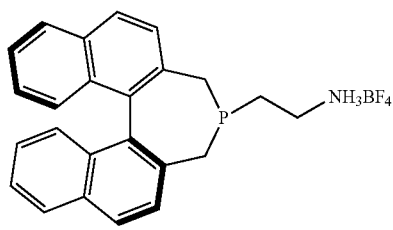

To a solution of 2-((11bS)-3H-Binaphtho[2,1-c:1',2'-e] phosphepin-4(5H)-yl)ethanamine (0.25 g, 0.70 mmol) in CH$_2$Cl$_2$ (10 mL) was added an aqueous solution of HBF$_4$ (0.092 mL, 48 wt %) dropwise via syringe. After stirring for 30 minutes at ambient temperature the organic layer was removed, dried over MgSO$_4$, and then reduced to dryness leaving a white solid (1m). The solid was redissolved in CH$_2$Cl$_2$ (2 mL) and then hexanes was added to afford a white solid which was filtered off and dried in vacuo. Yield 0.22 g (71%). $^1$H NMR (300 MHz, CD$_2$Cl$_2$): d 1.70 (dd, 2H, CH2), 2.30 (d, 4H, CH2), 2.65 (dd, 2H, CH2), 6.60 (br, 3H, NH$_3$), 6.95-7.82 (br m, 12H, Ar). $^{31}$P NMR (121.4 MHz, CD$_2$Cl$_2$): d −4.3(s). $^{19}$F NMR (282.3 MHz, CD$_2$Cl$_2$): d-487 (s).

Discussion

Treatment of a range of aminophosphines with aqueous HBF$_4$ (Scheme 3) results in the rapid and quantitative conversion to the corresponding quaternized ammonium derivatives. The resulting salts are readily isolated by separation of the biphasic mixture and precipitating from CH$_2$Cl$_2$ with diethyl ether. The salts are isolated in good to excellent yield as pure materials. Supporting their identity as quaternized ammonium salts (i.e. rather than phosphonium salts) are the minimally shifted $^{31}$P NMR chemical shifts of the products relative to the starting materials. Indeed, all of the quaternized ammonium salts yield $^{31}$P NMR spectra almost identical to the unprotected ligands save for the expected broadening of the signals. $^1$H NMR spectra confirm the absence of any strongly-$^{31}$P-coupled, single proton resonances while the presence of a single, broad resonance integrating to an intensity of three protons is consistent with quaternization of the amine.

Scheme 3. Synthesis of quaternized aminophosphines.

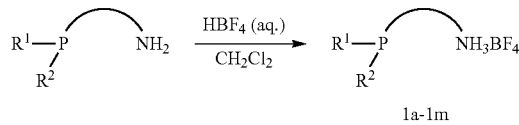

1a-1m

Quaternization of the aminophosphine ligands leads to marked physical changes for many of the materials examined. For instance, (1a) is isolated as an air-stable crystalline solid while the precursor, Ph$_2$PCH$_2$CH$_2$NH$_2$, is a highly sensitive oil which oxidizes on contact with air (vide infra). Obtaining pure samples of many aminophosphine ligands (e.g. Ph$_2$PCH$_2$CH$_2$NH$_2$ and $^i$Pr$_2$PCH$_2$CH$_2$NH$_2$) generally requires distillation of the highly reactive oils. Isolation of these materials as air-stable solid ammonium salts means that distillation can be foregone as recrystallization affords exceptionally pure material. The high-purity salts can, in turn, afford ligands of high purity (when neutralized with base) and ultimately high-purity transition-metal complexes.

Example 2

Diprotonated Aminophosphine Ligands

Example 2(a)

[$^i$Pr$_2$P(H)CH$_2$CH$_2$NH$_3$][BF$_4$]$_2$

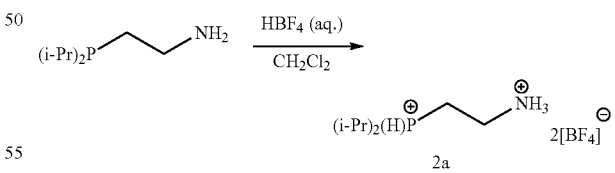

To a solution of $^i$Pr$_2$PCH$_2$CH$_2$NH$_2$ (0.25 g, 1.55 mmol) in CH$_2$Cl$_2$ (10 mL) was added an aqueous solution of HBF$_4$ (0.41 mL, 48% wt.) dropwise via syringe. After stirring for 30 minutes at ambient temperature the organic layer was removed, dried over MgSO$_4$ and then reduced to dryness leaving a white solid (2a). The solid was redissolved in CH$_2$Cl$_2$ (2 mL) and then diethyl ether was added to afford a white solid which was filtered off and dried in vacuo. Yield 0.30 g (57%). $^1$H NMR (300 MHz, d$_4$-MeOH): d 1.42 (m, 12H, CH$_3$), 2.70 (m, 2H, CH$_2$), 2.88 (m, 2H, CH$_2$), 3.40 (m, 2H, $NH_2$). $^{31}$P NMR (121.4 MHz, $d_4$-MeOH): d 30.1 (s). $^{19}$F NMR (376.3 MHz, $d_4$-MeOH): d −155.2 (s).

Discussion

The $^{31}$P NMR spectrum of the reaction product (2a) is characterized by two resonances; a very broad hump centred at 4.6 ppm which corresponds to 97% of the integrated intensity and a sharp singlet at 63.1 ppm (integrating to the remaining 3%). By comparison to an authentic sample, the peak at 63.1 ppm does not correspond to oxidized material (i.e. it is not the oxide of starting material or 1b). The reaction of $^iPr_2PCH_2CH_2NH_2$ with two equivalents of $HBF_4$ was thus explored to establish if the second (minor) component was the phosphonium. Protonation of both the amine and the phosphine functionalities was achieved and a pure, single material, (2a), was obtained. The product is characterized by a singlet at [31]P 30.1 and thus does not match that observed in the spectrum of (1b). The dibasic material, (2a), though oxygen-stable was found to be moderately hygroscopic and was thus manipulated under argon (although it was found that brief exposure to ambient conditions did not compromise the material).

Example 2(b)

2-(Di-tert-butylphosphonium)ethylammonium di-tetrafluoroborate

To a solution of 2-(di-tert-butylphosphino)ethylamine (0.50 g, 2.64 mmol) in $CH_2Cl_2$ (10 mL) was added an aqueous solution of $HBF_4$ (0.69 mL, 48 wt %) dropwise via syringe. After stirring for 30 minutes at ambient temperature the organic layer was removed, dried over $MgSO_4$, and then reduced to dryness leaving a white solid (2b). The solid was then washed with $Et_2O$ to afford a white solid which was filtered off and dried in vacuo. Yield 0.88 g (91%). $^1$H NMR (300 MHz, $CD_3OD$): d 1.54 (d, 18H, $^tBu$), 2.66 (m, 2H, $CH_2$), 3.43 (m, 2H, $CH_2$). $^{31}$P NMR (121.4 MHz, $CD_3OD$): d 41.0(s). $^{19}$F NMR (282.3 MHz, $CD_3OD$): d −153.3(s).

Example 3

Synthesis of Ruthenium Catalysts

Example 3(a)

$RuCl_2(Ph_2PCH_2CH_2NH_2)_2$

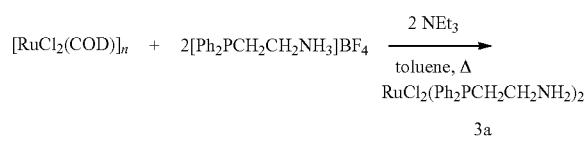

3a

In an Ar-filled flask, $[RuCl_2(COD)]_2$ (0.11 g, 0.39 mmol) and (1a) (0.25 g, 0.79 mmol) were combined with toluene (50 mL). $NEt_3$ (0.11 mL, 0.79 mmol) was added and the mixture was heated to reflux for 16 hours over which time a yellow solid formed. After cooling to ambient temperature, the solid was filtered off (in air), washed with (1:1) methanol/water (2×10 mL) and then with diethyl ether (2×5 mL) and dried in vacuo. Yield 0.19 g (77%). NMR data for this product match those reported previously.[1]

Example (3b)

$RuCl_2(R\text{-}BINAP)(Ph_2PCH_2CH_2NH_2)$

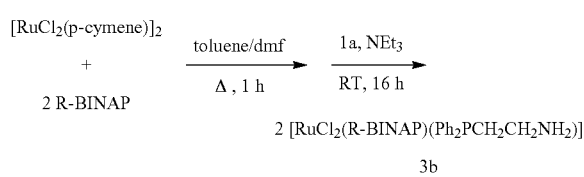

3b

In an Ar-filled flask, $[RuCl_2(p\text{-}cymene)]_2$ (0.24 g, 0.39 mmol) and R-BINAP (0.49 g, 0.79 mmol) were combined with toluene (18 mL) and dimethylformamide (2 mL). The mixture was heated to reflux for 1 hour and then cooled to ambient temperature. $NEt_3$ (0.11 mL, 0.79 mmol) and (1a) (0.25 g, 0.79 mmol) were added and the mixture was stirred at ambient temperature for 16 hours. The solvent was then removed and the pale red/brown residue washed with (1:1) methanol/water (2×10 mL) and then with diethyl ether (2×5 mL) and dried in vacuo. Yield 0.69 g (86%). NMR data for this product match those reported previously.[1]

Example 3(c)

$RuCl_2(^iPr_2PCH_2CH_2NH_2)_2$

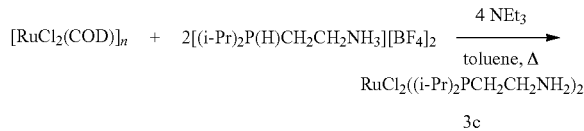

3c

In an Ar-filled flask, $[RuCl_2(COD)]_2$ (0.05 g, 0.19 mmol) and (2a) (0.15 g, 0.40 mmol) were combined with toluene (20 mL). $NEt_3$ (0.12 mL, 0.84 mmol) was added and the mixture was heated to reflux for 16 hours over which time an orange-brown solid formed. After cooling to ambient temperature, the solid was filtered off (in air), washed with (1:1) methanol/water (2×10 mL) and then with diethyl ether (2×5 mL) and dried in vacuo. Yield 0.05 g (55%). $^1$H NMR (300 MHz, $CD_2Cl_2$): d 1.25 (br m, 24H, $CH_3$), 1.99 (br m, 4H, $CH_2$), 2.52 (br sept, 4H, CH), 3.05 (br, 4H), 3.67 (br, 4H). $^{31}$P NMR (121.4 MHz, $CD_2Cl_2$): d 60.7 (br).

Discussion

The utility of the quaternized ammonium salts in the synthesis of transition-metal complexes was explored. Derivatives of (1a)-(4b) were prepared. For the synthesis of ruthenium bis-aminophosphine complex $RuCl_2(Ph_2PCH_2CH_2NH_2)_2$, (3a), adding a stoichiometric amount of $NEt_3$ to the otherwise standard reaction conditions[5] allows for isolation of the identical bis-aminphosphine complex that would be obtained if the unprotected ligands were employed. The simplification of the synthesis of such complexes using these salts warrants emphasis. Simply combining the solid precursors (often in air) followed by addition of solvent and base greatly simplifies the preparation which normally requires the addition of the reactive phosphine under strictly anaerobic conditions.

A range of complexes have been prepared using the ammonium salts in place of their unprotected congeners including the chiral R-BINAP derivative, (3b). Once again, substituting the reactive unprotected ligand for the salt and addition of NEt$_3$ to the standard synthetic protocol[6] gives high yields of pure materials without having to handle the readily oxidized liquid aminophosphine.

In the case of (2a), where two equivalents of acid were used to isolate a pure (dibasic) salt, a similar protocol can be employed to prepare the corresponding ruthenium complexes. In this case, two equivalents of base per equivalent of ligand are required to neutralize the protected aminophosphines. Here again, the convenience of these salts is highlighted as use of the ligand salt circumvents the requirement of handling the pyrophoric ligand, $^iPr_2PCH_2CH_2NH_2$.

Example 4

Synthesis of Rhodium Catalysts using Acid-Susceptible Anionic Ligands

Example 4(a)

[Rh(COD)(Ph$_2$PCH$_2$CH$_2$NH$_2$)]BF$_4$

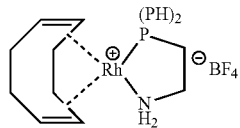

In an Ar-filled flask, a solution of [Rh(COD)(acac)] (0.09 g, 0.32 mmol) in CH$_2$Cl$_2$ (15 mL) was set to stir as a solution of (1a) (0.10 g, 0.32 mmol) in CH$_2$Cl$_2$ (10 mL) was added. The mixture was stirred for 1 hour at ambient temperature and then concentrated to approximately 5 mL in volume. Addition of diethyl ether afforded a yellow crystalline solid (4a) which was filtered off and dried in vacuo. Yield 0.69 g (79%). $^1$H NMR (300 MHz, CD$_2$Cl$_2$): d 2.0-2.42 (br m, 8H), 2.60-2.81 (br m, 2H), 3.66 (br, 2H), 3.74 (br, 2H), 5.33 (br, 2H), 7.16-7.60 (br, 10H, Ar). $^{31}$P NMR (121.4 MHz, CD$_2$Cl$_2$): d 45.6 (d, J$_{RhP}$=158 Hz). $^{19}$F NMR (282.3 MHz, CD$_2$Cl$_2$): d –152.0 (s).

Example 4(b)

(1S,2S)-2-Amino-1-phenylpropyldiphenylphosphino (1,5-cyclo-octadiene)rhodium (I)

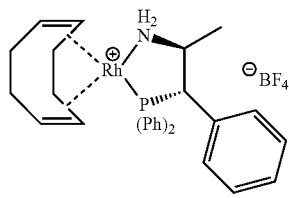

To a CH$_2$Cl$_2$ solution (5 mL) of the acetylacetonato(1,5-cyclo-octadiene)rhodium (I) (76 mg, 0.25 mmol) was added to a CH$_2$Cl$_2$ solution (5 mL) of the (1S,2S)-1-phenylpropyli- diphenylphosphino-2-ammonium tetrafluoroborate (100 mg, 0.25 mmol). The reaction mixture was stirred for one hour. The solvent was then concentrated to about 1 ml and then the product (4b) was precipitated from Et$_2$O (20 mL) to obtain a pale yellow crystalline solid. Yield 80 mg (53%). $^{31}$P NMR (121.4 MHz, CD$_2$Cl$_2$): d 57.3 (d, J$_{RhP}$=158 Hz). $^{19}$F NMR (282.3 MHz, CD$_2$Cl$_2$): d –150.3 (s).

Example 4(c)

(1R,2R)-2-(Diphenylphosphino)-1,2-diphenylethy- lamimo(1,5-cyclo-octadiene)rhodium (I)

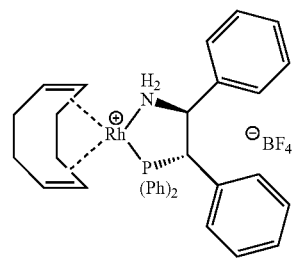

To a CH$_2$Cl$_2$ solution (5 mL) of the acetylacetonato(1,5-cyclo-octadiene)rhodium (I) (20 mg, 0.064 mmol) was added to a CH$_2$Cl$_2$ solution (5 mL) of the (1R,2R)-2-(Diphenylphosphino)-1,2-diphenylethylammonium tetrafluoroborate (30 mg, 0.064 mmol). The reaction mixture was stirred for one hour. The solvent was then concentrated to about 1 ml and then the product (4c) was precipitated from Et$_2$O (20 mL) to obtain a yellow crystalline solid. Yield 35 mg (81%). $^{31}$P NMR (121.4 MHz, CD$_2$Cl$_2$): 53.1 (d, J$_{RhP}$=158 Hz). $^{19}$F NMR (282.3 MHz, CD$_2$Cl$_2$): –150.7 (s).

Example 4(d)

(R)-1-(2-(diphenylphosphino)phenyl)ethanamino(1, 5-cyclo-octadiene)rhodium (I)

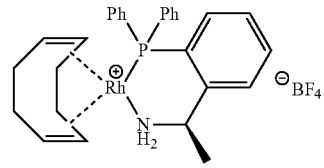

To a CH$_2$Cl$_2$ solution (5 mL) of the acetylacetonato(1,5-cyclo-octadiene)rhodium (I) (78 mg, 0.25 mmol) was added to a CH$_2$Cl$_2$ solution (5 mL) of the (R)-1-(2-(diphenylphosphino)phenyl)ethanammonium tetrafluoroborate (100 mg, 0.25 mmol). The reaction mixture was stirred for one hour. The solvent was then concentrated to about 1 ml and then the product was precipitated from Et$_2$O (20 mL) to obtain a yellow crystalline solid (4d). Yield 88 mg (57%). $^{31}$P NMR (121.4 MHz, CD$_2$Cl$_2$): 20.1 (d, J$_{RhP}$=153 Hz). $^{19}$F NMR (282.3 MHz, CD$_2$Cl$_2$): –151.9 (s).

Example 4(e)

(1R,2R)-2(diphenylphosphino)-2,3-dihydro-1H-inden-1-amino(1,5-cyclo-octadiene)rhodium (I)

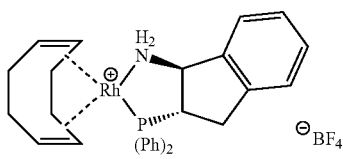

To a CH$_2$Cl$_2$ solution (5 mL) of the acetylacetonato(1,5-cyclo-octadiene)rhodium (I) (76 mg, 0.25 mmol) was added to a CH$_2$Cl$_2$ solution (5 mL) of the (1R,2R)-2-(diphenylphosphino)2,3-dihydro-1H-inden-1-ammonium tetrafluoroborate (100 mg, 0.25 mmol). The reaction mixture was stirred for one hour. The solvent was then concentrated to about 1 ml and then the product was precipitated from Et$_2$O (20 mL) to obtain a yellow crystalline solid (4e). Yield 75 mg (49%). $^{31}$P NMR (121.4 MHz, CD$_2$Cl$_2$): 28.7 (d, J$_{RhP}$=157 Hz). $^{19}$F NMR (282.3 MHz, CD$_2$Cl$_2$): −151.4 (s).

Example 4(f)

(R)-8-(diphenylphosphino)-1,2,3,4-tetrahydronaphthalen-1-amino(1,5-cyclo-octadiene)rhodium (I)

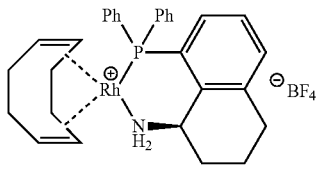

To a CH$_2$Cl$_2$ solution (5 mL) of the acetylacetonato(1,5-cyclo-octadiene)rhodium (I) (74 mg, 0.24 mmol) was added to a CH$_2$Cl$_2$ solution (5 mL) of the (R)-8-(diphenylphosphino)-1,2,3,4-tetrahydronaphthalen-1-ammonium tetrafluoroborate (100 mg, 0.24 mmol). The reaction mixture was stirred for one hour. The solvent was then concentrated to about 1 ml and then the product was precipitated from Et$_2$O (20 mL) to obtain a yellow crystalline solid (4f). Yield 83 mg (55%). $^{31}$P NMR (121.4 MHz, CD$_2$Cl$_2$): 22.3 (d, J$_{RhP}$=154 Hz). $^{19}$F NMR (282.3 MHz, CD$_2$Cl$_2$): −151.4 (s).

Example 4(g)

(R)-1-((S)-2-Diphenylphosphino)ferrocenylethylamino(1,5-cyclo-octadiene)rhodium (I)

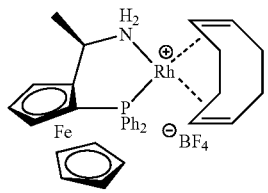

To a CH$_2$Cl$_2$ solution (5 mL) of the acetylacetonato(1,5-cyclo-octadiene)rhodium (I) (62 mg, 0.20 mmol) was added to a CH$_2$Cl$_2$ solution (5 mL) of the (R)-1-((S)-2-Diphenylphosphino)ferrocenylethylammonium tetrafluoroborate (100 mg, 0.20 mmol). The reaction mixture was stirred for one hour. The solvent was then concentrated to about 1 ml and then the product was precipitated from Et$_2$O (20 mL) to obtain a orange crystalline solid (4g). Yield 97 mg (69%). $^{31}$P NMR (121.4 MHz, CD$_2$Cl$_2$): 11.5 (d, J$_{RhP}$=152 Hz). $^{19}$F NMR (282.3 MHz, CD$_2$Cl$_2$): −152.0 (s).

Discussion

Having established that addition of base to the salts affords access to analogous chemistry as the ligands themselves, using the salts as acids to install the ligand by protonation and subsequent removal of acid-susceptible anionic ligands was investigated. The reaction of (1a) with Rh(COD)(acac) was examined to see if the ammonium salts could remove (by protonation) the acetylacetonate ligand and install the aminophosphine, Ph$_2$PCH$_2$CH$_2$NH$_2$, in its place. This was indeed the case as the novel rhodium complex, (4a), was isolated in good yield and excellent purity thus establishing an alternate method of use for the quaternary ammonium phosphine salts. A series of chiral rhodium complexes (4b)-(4g) were derived in an analogous manner. The X-Ray crystal structure of compound (4g) was obtained and is shown in FIG. 1.

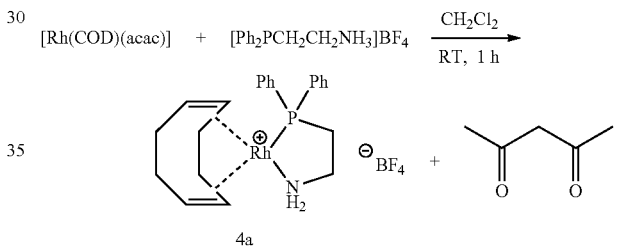

Example 5

General Procedure for Ru-Catalyzed Hydrogenations

A solution of substrate (8.3 mmol) in solvent (10 ml) was added to a 50 mL Schlenk flask. After evacuating and refilling with argon, a mixture of catalyst (0.01 mmol) and base (0.18 mmol; where necessary) was added. The resulting mixture was then injected into a 100 mL autoclave which had been previously placed under an atmosphere of H$_2$. The autoclave was pressurized to 200 psig and the reaction mixture was stirred at ambient temperature. The reaction progress was monitored by TLC. Upon completion of the reaction, the solvent was removed under vacuum and the mixture was filtered through silica gel (ca. 6 cm) using 3:1 hexane:ethyl acetate. The solvent was removed from the filtrate affording the product.

Discussion

The utility of the derived compounds in catalysis was then examined. For the ruthenium complexes, (3a) and (3b), we studied the direct hydrogenation of acetophenone. Both complexes were found to be highly active for the reduction of acetophenone giving complete conversion to 1-phenylethanol in under 2 hours. In the case of (3b), a 47% e.e. was observed (see Table 1).

Example 6

General Procedure for Rh-Catalyzed Hydrogenations

In an Ar-filled flask, catalyst (0.005 mmol) and base (0.18 mmol; where necessary) were combined in the desired solvent (3 mL). This mixture was stirred at ambient temperature for 5 minutes and then transferred to a 50 mL autoclave which had been previously charged with substrate (1 mmol) and solvent (2 mL). The autoclave was then purged three times with $H_2$ (100 psig) and finally pressurized to 180 psig. The reaction mixture was stirred overnight at ambient temperature. Conversion was monitored by a combination of $^1H$ NMR and GC.

Discussion

For the achiral Rh complex, (4a), it was found that, in the absence of base, no catalytic activity was observed for acetophenone hydrogenation (see Table 2, Entry 1). However, upon addition of base, 86 conversion was reached in 2 hours (see Table 2, Entry 2) while after 22 hours the hydrogenation was essentially complete (see Entry 3).

The efficacy of the rhodium complex, (4a), was also examined in the hydrogenation of enamide substrate 5 (see Table 3) and α,β-unsaturated ketone, 2-cyclohexenone (7, see Table 4). For the reduction of the enamide, 5, only 30% conversion was observed after 22 hours. For cyclohexenone, after 2 hours, 36% conversion to cyclohexanone (8a) and 38% conversion to cyclohexanol (8b) was observed. The remaining 26% was starting material. This later result is intriguing as the possibility of stepwise reduction of alkene followed by ketone suggests the possibility of tuning the reactivity to affect either complete reduction of α,β-unsaturated ketones or selective reduction of the alkene without reduction of the ketone.

Finally, the efficacy of the chiral Rh catalysts (4b)-(4g) in the hydrogenation of acetophenone (see Table 5) was examined. While all of the chiral Rh derivatives showed some activity in hydrogenation, catalysts (4b)-(4g) were quite reasonable reaching approximately 70% conversion in 4 hours. In all cases, the enantioselectivity was limited as the best result was 23.7% after 4 hours using catalyst (4f).

The reaction of aminophosphine type ligands with stoichiometric amounts of $HBF_4$ affords access to the corresponding ammonium salts. These salts are convenient alternatives to the easily oxidized or even pyrophoric ligands themselves as they can be conveniently handled in air or under much less rigorous conditions. Moreover, the salts offer the possibility of recrystallization as a route to purified aminophosphine type ligands as neutralization with base is clean and quantitative. The salts are readily deployed in the synthesis of transition-metal complexes with minimal change to existing protocols and also offer access to new modes of aminophosphine installation where anionic ligands can be protonated off with the acidic salts.

Example 7

Selective Hydrogenation of 5-vinyl-2-norbornene

In an autoclave, 5-vinyl-2-norbornene (0.200 g, 1.66 mmol) was combined with catalyst (0.664 mmol, 400 equiv.) and 3.5 mL of $CH_2Cl_2$. The autoclave was sealed and purged three times with $H_2$ (100 psig) and finally pressurized to 100 psig. The reaction was allowed to proceed at room temperature for the specified time. Reaction progress was monitored by a combination of GC and NMR.

Discussion

As seen in Table 6, catalyst 4a had the highest selectivity for the endo-cyclic olefin, at a total conversion yield of 96%. Further, the product in which only the endo-cyclic double bond was hydrogenated formed 71% of the product mixture. Catalysts 4d and 4h were also both examined for their ability to selectively hydrogenate the endo-cyclic double bond (63.0% and 48.5%, respectively).

Example 8

Solvent Effects on the 4a-Catalyzed Selective Hydrogenation of 5-vinyl-2-norbornene In an autoclave, 5-vinyl-2-norbornene (0.200 g, 1.66 mmol) was combined with catalyst 4a (0.664 mmol, 400 equiv.) and 3.5 mL of the desired solvent. The autoclave was sealed and purged three times with $H_2$ (100 psig) and finally pressurized to 100 psig. The reaction was allowed to proceed at room temperature for the specified time. Reaction progress was monitored by a combination of GC and NMR.

Discussion

As seen in Table 7, when the reaction is run for a longer time (18 h), the amount of the product in which both olefins are hydrogenated generally increases significantly. When the reaction is run in acetone for 2 hours, the compound in which the endo-cyclic olefin is selectively hydrogenated is obtained in 63% yield.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

TABLE 1

Ru-Catalyzed Hydrogenation of Acetophenone.

| Entry | Catalyst | S:C | Time (h) | Conversion (%) | e.e. (%) |
|---|---|---|---|---|---|
| 1 | 3a | 830 | 2 | >99 | n/a |
| 2 | 3b | 830 | 2 | >99 | 47 |

TABLE 2

Hydrogenation of Acetophenone Using 4a

| Entry | Solvent | Base | Time (h) | Conversion (%) |
|---|---|---|---|---|
| 1 | $^i$PrOH | None | 2 | 0 |
| 2 | $^i$PrOH | KO$^t$Bu | 2 | 86 |
| 3 | $^i$PrOH | KO$^t$Bu | 22 | 99 |

TABLE 3

Hydrogenation of Enamide Using 4a.

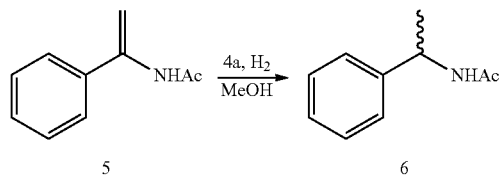

| Solvent | Base | Time (h) | Conversion (%) |
|---|---|---|---|
| MeOH | None | 22 | 30 |

TABLE 4

Rh-Catalyzed Hydrogenation of Cyclohexenone.

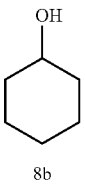

| Solvent | Base | Time (h) | 8a (%) | 8b (%) |
|---|---|---|---|---|
| $^i$PrOH | KO$^t$Bu | 2 | 36 | 38 |

TABLE 5

Acetophenone Reduction Via Chiral Rhodium Catalysts.[a]

| Entry | Catalyst | Time (h) | Conversion (%) | e.e. (%) |
|---|---|---|---|---|
| 1 | 4b | 4 | 70 | 14.7 |
| 2 | 4b | 72 | >99 | 14.5 |
| 3 | 4c | 4 | 68 | 9.7 |
| 4 | 4c | 72 | >99 | 10 |
| 5 | 4d | 4 | 70 | 4.7 |
| 6 | 4d | 72 | >99 | 3.7 |
| 7 | 4e | 4 | 64 | 9.0 |
| 8 | 4e | 72 | >99 | 9.7 |
| 9 | 4f | 4 | 41 | 23.7 |
| 10 | 4f | 72 | >99 | 13.5 |
| 11 | 4g | 4 | 30 | 0 |
| 12 | 4g | 72 | >99 | 0 |

[a]$^i$PrOH solvent; KO$^t$Bu base.

TABLE 6

Selective Hydrogenation of 5-vinyl-2-norbornene

| Entry | Catalyst | Time (h) | Conversion (%) | (%) | (%) | Others* (%) |
|---|---|---|---|---|---|---|
| 1 | 4a | 18 | 96.0 | 71.2 | 19.0 | 9.8 |
| 2 | 4h | 18 | 99.0 | 48.5 | 41.0 | 10.5 |
| 3 | 4d | 18 | 92.0 | 63.0 | 25.0 | 12.0 |

*Includes starting material and other unidentified materials.

TABLE 7

Solvent Effects on 4a-Catalyzed Selective Hydrogenation of 5-vinyl-2-norbornene

| Entry | Solvent | Time (h) | Conversion (%) | (%) | (%) | Others* (%) |
|---|---|---|---|---|---|---|
| 1 | CH2Cl2 | 1 | 10.0 | 7.8 | 1.7 | 90.5 |
| 2 | CH2Cl2 | 18 | 73.0 | 52.5 | 20.5 | 27.0 |
| 3 | MeOH | 1 | 77.0 | 30.0 | 37.0 | 33.0 |
| 4 | MeOH | 18 | >99 | 4.6 | 94.8 | 0.6 |
| 5 | i-PrOH | 1 | 77.0 | 34.8 | 32.3 | 32.9 |
| 6 | i-PrOH | 18 | >99 | 11.0 | 89.0 | 0.0 |
| 7 | diethylether | 2 | 18.0 | 12.0 | 6.0 | 82.0 |
| 8 | diethylether | 18 | 78.0 | 44.0 | 34.0 | 22.0 |
| 9 | dioxane | 2 | 86.0 | 38.0 | 48.0 | 14.0 |
| 10 | dioxane | 18 | >99 | 0.0 | 99.5 | 0.5 |
| 11 | hexane | 2 | 5.0 | 4.0 | 1.0 | 95.0 |
| 12 | hexane | 18 | 26.0 | 22.0 | 4.0 | 74.0 |
| 13 | acetone | 2 | 85.0 | 63.0 | 22.0 | 15.0 |
| 14 | acetone | 18 | >99 | 11.0 | 89.0 | 0.0 |
| 15 | THF | 2 | 60.0 | 51.0 | 8.0 | 41.0 |
| 16 | THF | 18 | 92.0 | 61.0 | 31.0 | 8.0 |
| 17 | acetonitrile | 2 | 73.0 | 48.0 | 25.0 | 27.0 |
| 18 | acetonitrile | 18 | >99 | 0.0 | 99.2 | 0.8 |

*Includes starting material and other unidentified materials.

Full Citations for Documents Referred to in the Specification
1. Amoroso, D.; Graham, T. W.; Guo, R.; Tsang, C.-W.; Abdur-Rashid, K. *Aldrichimica Acta* 2008, 41, 1, 15.
2. Diver, S. T. In *Encyclopedia of Reagents for Organic Synthesis*; Paquette, L. A., Ed.; Wiley: New York, 1995; Vol. 7.
3. Netherton, M. R.; Fu, G. C. *Org. Lett.* 2001, 3, 4295.
4. (a) Dahlhoff, W. V.; Dick, T. R.; Nelson, S. M. *J. Chem. Soc. (A)* 1969, 2919. (b) Taylor, R. C.; Kolodny, R. A. *J. Chem. Soc., Chem. Comm.* 1970, 813. (c) Kolodny, R. A.; Morris, T. L.; Taylor, R. C. *J. Chem. Soc., Dalton Trans.* 1973, 328.
5. Abdur-Rashid, K.; Guo, R.; Lough, A. J.; Morris, R. H.; Song, D. *Adv. Synth. Catal.* 2005, 347, 571.
6. PCT Appl. WO 2002 22526. Published Mar. 21, 2002.

We claim:

1. A method for preparing a metal catalyst comprising at least one ligand that is coordinated to the metal through at least one phosphorous (P) atom and at least one nitrogen (N) atom, the method comprising reacting a metal pre-cursor complex with an acid addition salt of an aminophosphine, diaminophosphine, aminodiphosphine or diaminodiphosphine ligand, in the presence of a base.

2. The method according to claim 1, wherein the metal precursor complex is a compound of the Formula (I)

$$M(X)_a(W)_b(Y)_c(Z)_d \qquad (I)$$

wherein
M is a transition metal;
X is any anionic ligand;
W is any co-ordinating ligand;
Y is a neutral ligand;
Z is an acid susceptible anionic ligand;
a is 0, 1 or 2;
b is 0 or 1;
c is 0, 1 or 2; and
d is 0 or 1.

3. The method according to claim 2, wherein M is ruthenium, rhodium, iron, osmium, iridium, palladium or copper.

4. The method according to claim 1, wherein the aminophosphine ligand is a compound of the Formula II

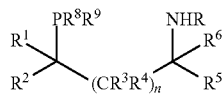

wherein
R and $R^1$ to $R^6$ are simultaneously or independently selected from H, $C_{1-20}$alkyl, $C_{2-20}$alkenyl, $C_{2-20}$alkynyl, $C_{3-20}$cycloalkyl, aryl and heteroaryl, said latter 6 groups being optionally substituted, or two or more of R and $R^1$ to $R^6$, are joined to form, together with the carbon or nitrogen atoms to which they are attached, one or more optionally substituted monocyclic or polycyclic, metalated, saturated, unsaturated and/or aromatic ring systems having 3 or more atoms;
$R^8$ and $R^9$ are simultaneously or independently selected from H, $C_{1-20}$alkyl, $C_{2-20}$alkenyl, $C_{2-20}$alkynyl, aryl, heteroaryl, $OR^{10}$ and $N(R^{10})_2$, said latter 7 groups being optionally substituted, or $R^8$ and $R^9$ are linked together to form an optionally substituted monocyclic or polycylic, saturated, unsaturated and/or aromatic ring system having 4 or more atoms, including the phosphorous atom to which said $R^8$ and $R^9$ groups are bonded, and in which one or more carbon atoms in said monocyclic or polycyclic ring system are optionally replaced with a heteromoiety selected from O, S, N, NH, $NC_{1-6}$alkyl, N(O), SiH, $SiC_{1-6}$alkyl and $Si(C_{1-6}alkyl)_2$;
$R^{10}$ is selected from $C_{1-6}$alkyl, $C_{2-6}$alkenyl, $C_{2-6}$alkynyl and aryl, said latter 4 groups being optionally fluoro-substituted;
the optional substituents are selected from one or more of halo, OH, $NH_2$, $OR^{11}$, $N(R^{11})_2$ and $R^{11}$; and
$R^{11}$ is selected from $C_{1-6}$alkyl, $C_{2-6}$alkenyl, $C_{2-6}$alkynyl and aryl, said latter 4 groups being optionally fluoro-substituted, and
n is 0, 1, 2, 3 or 4.

5. The method according to claim 4, wherein R and $R^1$ to $R^6$ are simultaneously or independently selected from the group consisting of H, $C_{1-10}$alkyl, $C_{2-10}$alkenyl, $C_{2-10}$alkynyl, $C_{3-10}$cycloalkyl, aryl and heteroaryl, said latter 6 groups being optionally substituted, or two or more of R and $R^1$ to $R^6$, are joined to form, together with the carbon or nitrogen atoms to which they are attached, one or more optionally substituted monocyclic or polycyclic, metalated, saturated, unsaturated and/or aromatic ring systems having 5 or more atoms.

6. The method according to claim 5, wherein R is H and $R^1$ to $R^6$ are simultaneously or independently selected from H, methyl, or phenyl, or two adjacent or geminal groups, are bonded together with the carbons to which said groups are attached, or together with the nitrogen atom of the amino group, to form one or two phenyl, indanyl, ferrocenyl, naphthyl or pyrrolidinyl rings.

7. The method according to claim 4, wherein $R^8$ and $R^9$ are simultaneously or independently selected from H, $C_{1-10}$alkyl, $C_{2-10}$alkenyl, $C_{2-10}$alkynyl and aryl, said latter 4 groups being optionally substituted, or $R^8$ and $R^9$ are linked together to form an optionally substituted monocyclic or polycyclic ring system having 4 or more atoms, including the phosphorous atom to which $R^8$ and $R^9$ are bonded, in which the rings are saturated, unsaturated and/or aromatic and in which one or more carbon atoms in said monocyclic or polycyclic ring system are optionally replaced with a heteromoiety selected from O, N, NH and $NC_{1-6}$alkyl.

8. The method according to claim 7, wherein $R^8$ and $R^9$ are linked to form an optionally substituted fused pentacyclic ring system having 23 atoms, including the phosphorous atom to which $R^8$ and $R^9$ are bonded.

9. The method according to claim 8, wherein the fused pentacyclic ring system comprises

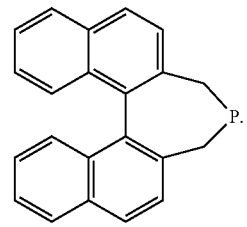

10. The method according to claim 4, wherein the compound of Formula (II) is selected from

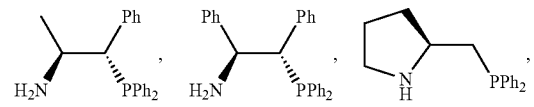

-continued

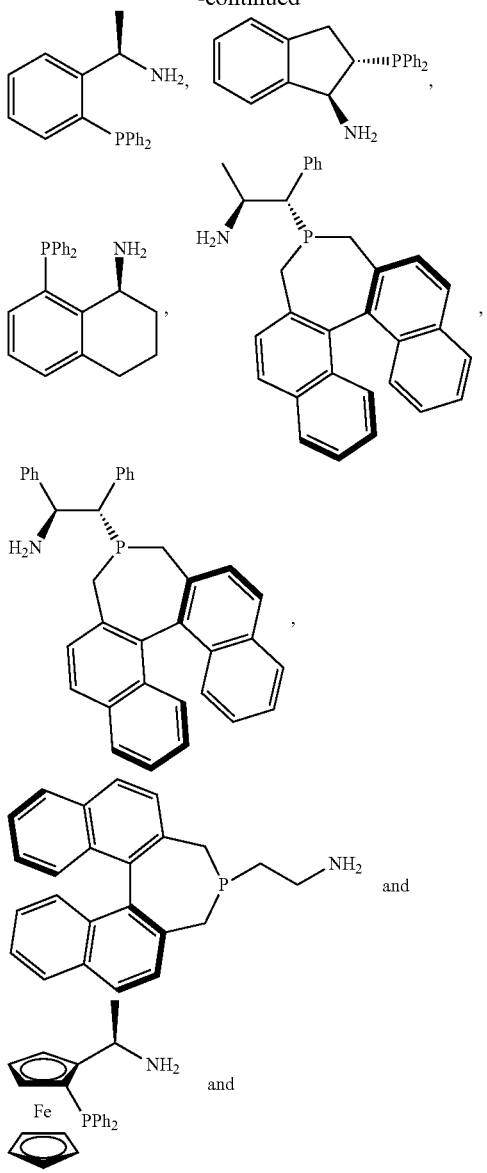

all alternate optical isomers, thereof.

11. The method according to claim 1, wherein the diaminophosphine is a compound of the Formula III:

$$R^{12}R^{13}P\text{-}Q^1\text{-}NR^{14}\text{-}Q^2\text{-}NR^{15}R^{16} \qquad (III)$$

$R^{12}$ and $R^{13}$ are independently as defined for $R^8$ and $R^9$ in claim 9, $Q^1$ and $Q^2$ are selected from unsubstituted and substituted $C_1$-$C_8$alkylene and unsubstituted or substituted $C_1$-$C_8$alkenylene where the substituents on $Q^1$ and $Q^2$ are independently selected from one or more of $C_{1-6}$alkyl, fluoro-substituted $C_{1-6}$alkyl, halo, $C_{1-6}$alkoxy, fluoro-substituted $C_{1-6}$alkoxy and unsubstituted or substituted $C_{6-14}$aryl and/or two or more substituents on $Q^1$ may be joined together to form, including the carbon atoms to which they are attached, one or more unsubstituted or substituted 5-14-membered monocyclic, polycyclic, heterocyclic, carbocyclic, saturated, unsaturated or metallocenyl ring systems, and $R^{14}$, $R^{15}$ and $R^{16}$ are independently selected from H, $C_{1-6}$alkyl, fluoro-substituted $C_{1-6}$alkyl and $C_{6-14}$aryl, the latter group being optionally substituted with one to five substituents independently selected from $C_{1-6}$alkyl, fluoro-substituted $C_{1-6}$alkyl, halo, $C_{1-6}$alkoxy, fluoro-substituted $C_{1-6}$alkoxy and $C_{6-14}$aryl.

12. The method according to claim 1, wherein the aminodiphosphine ligand is a compound of the formula (IV)

$$R^{17}R^{18}P\text{-}Q^3\text{-}NR^{19}\text{-}Q^4\text{-}PR^{20}R^{21} \qquad (III)$$

wherein $R^{17}$, $R^{18}$, $R^{20}$ and $R^{21}$ are independently as defined for $R^{12}$ and $R^{13}$ in claim 11, $Q^3$ and $Q^4$ are independently as defined for $Q^1$ and $Q^2$ in claim 11 and $R^{19}$ is as defined for $R^{14}$, $R^{15}$ and $R^{16}$ in claim 11.

13. The method according to claim 1, wherein the diaminodiphosphine ligand is a compound of the formula (V)

$$R^{22}R^{23}P\text{-}Q^5\text{-}NR^{24}\text{-}Q^6NR^{25}\text{-}Q^7\text{-}PR^{26}R^{27} \qquad (IV)$$

wherein $R^{22}$, $R^{23}$, $R^{26}$ and $R^{27}$ are independently as defined for $R^{12}$ and $R^{13}$ in claim 11, $Q^5$, $Q^6$ and $Q^7$ are independently as defined for $Q^1$ and $Q^2$ in claim 11, and $R^{24}$ and $R^{25}$ are as defined for $R^{14}$, $R^{15}$ and $R^{16}$ in claim 11.

14. The method according to claim 1, wherein the acid addition salt of the aminophosphine, diaminophosphine, aminodiphosphine or diaminodiphosphine ligand is prepared by reacting the ligand with a protic acid.

15. The method according to claim 1, wherein the metal catalyst is selected from:
RuCl$_2$(Ph$_2$PCH$_2$CH$_2$NH$_2$)$_2$,
RuCl$_2$(R-BINAP)(Ph$_2$PCH$_2$CH$_2$NH$_2$)$_2$,
RuCl$_2$(i-Pr$_2$PCH$_2$CH$_2$NH$_2$)$_2$,
[Rh(COD)(Ph$_2$PCH$_2$CH$_2$NH$_2$)]BF$_4$,

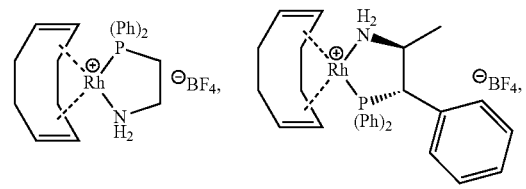

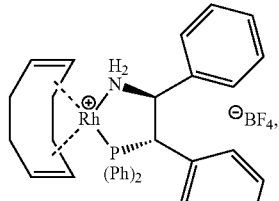

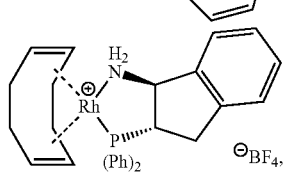

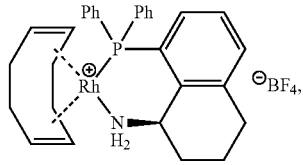

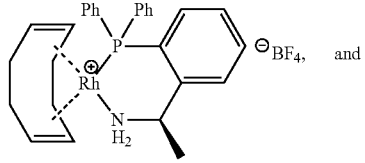

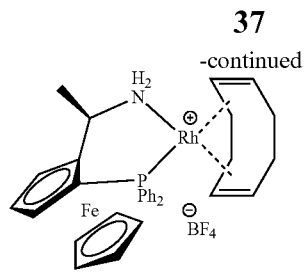

and all optical isomers thereof, including mixtures in any ratio.

16. The method according to claim 1, wherein the at least one ligand of the catalyst comprises a chiral ligand, wherein the chiral ligand is selected from:

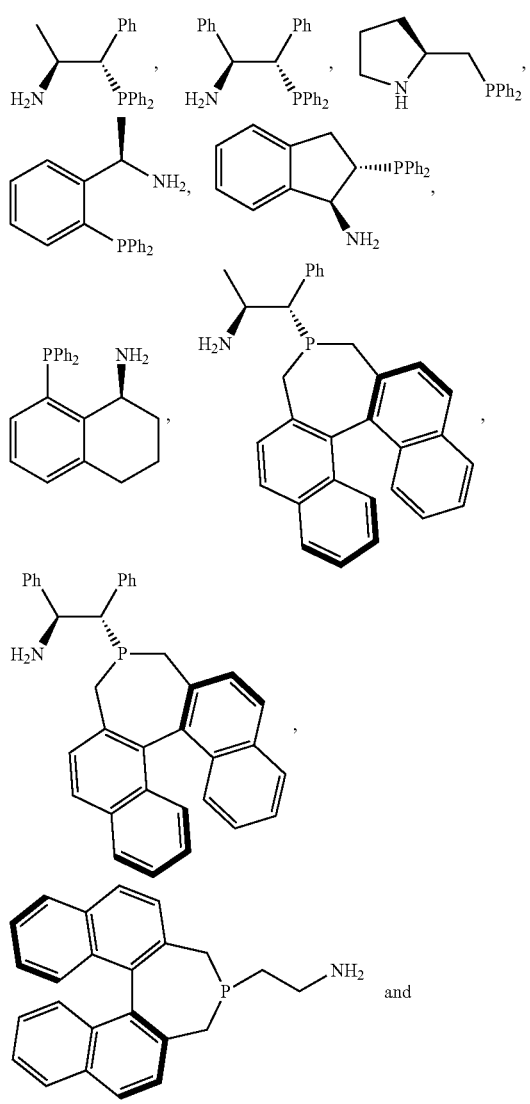

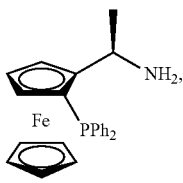

and all alternate optical isomers thereof.

17. A method for the selective hydrogenation of double bonds in compounds containing more than one double bond comprising contacting the compound containing more than one double bond with a metal catalyst produced in accordance with the method of claim 1 under conditions for performing the selective hydrogenation reaction, and optionally isolating one or more products from the selective hydrogenation reaction.

18. The method according to claim 17, wherein the compound containing more than one double bond comprises at least one double bond in a different chemical environment from another double bond.

19. The method according to claim 18, wherein the compound containing more than one double bond comprises at least one endo-cyclic double bond and at least one exo-cyclic double bond.

20. The method according to claim 19, wherein the compound containing more than one double bond is

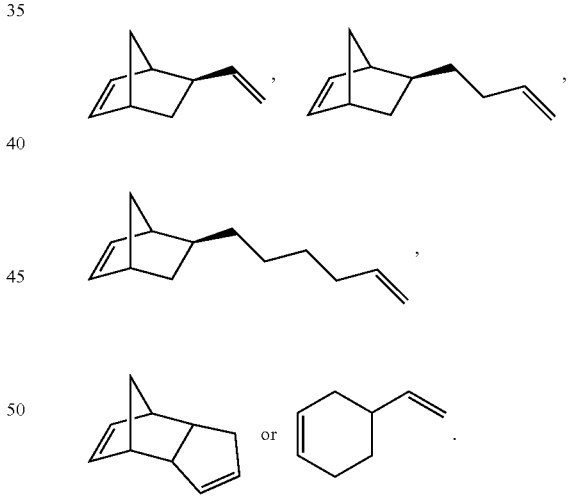

21. The method according to claim 19, wherein the endo-cyclic double bond is selectively hydrogenated over the exo-cylic double bond.

* * * * *

UNITED STATES PATENT AND TRADEMARK OFFICE
CERTIFICATE OF CORRECTION

PATENT NO. : 8,716,508 B2  
APPLICATION NO. : 13/123982  
DATED : May 6, 2014  
INVENTOR(S) : Kamaluddin Abdur-Rashid et al.

Page 1 of 1

It is certified that error appears in the above-identified patent and that said Letters Patent is hereby corrected as shown below:

In the Claims

Column 35, last chemical structure remove the second "and" as indicated below:

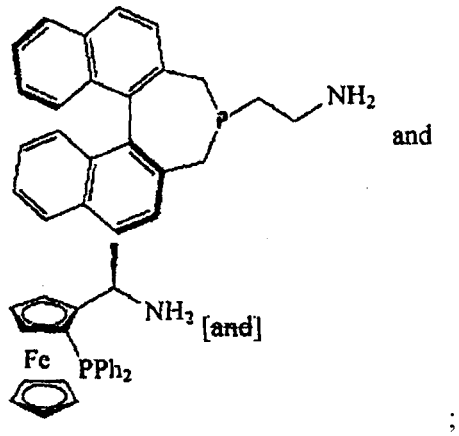

;

Column 35, last line of claim 10, insert --and-- before --all alternate optical isomers, thereof.--;

Column 35, line 53, replace "claim 9" with --claim 4--; and

Column 36, line 16 (formula IV), replace "$R^{22}R^{23}P-Q^5-NR^{24}-Q^6NR^{25}-Q^7-PR^{26}R^{27}$" with --$R^{22}R^{23}P-Q^5-NR^{24}-Q^6-NR^{25}-Q^7-PR^{26}R^{27}$--.

Signed and Sealed this  
Twenty-fourth Day of February, 2015

Michelle K. Lee  
*Deputy Director of the United States Patent and Trademark Office*